(12) United States Patent
Fung et al.

(10) Patent No.: US 11,298,876 B2
(45) Date of Patent: Apr. 12, 2022

(54) THREE-DIMENSIONAL PRINTING

(71) Applicant: HEWLETT-PACKARD DEVELOPMENT COMPANY, L.P., Spring, TX (US)

(72) Inventors: Erica Fung, San Diego, CA (US); Carolin Fleischmann, San Diego, CA (US); Jesiska Tandy, San Diego, CA (US); Carmina Querol Esparch, Sant Cugat del Valles (ES); Greg S. Long, Corvallis, OR (US); Ali Emamjomeh, San Diego, CA (US); Shannon Reuben Woodruff, San Diego, CA (US); Rachael Donovan, San Diego, CA (US); Kenneth Flack, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,377

(22) PCT Filed: Jun. 19, 2018

(86) PCT No.: PCT/US2018/038268
§ 371 (c)(1),
(2) Date: Oct. 15, 2019

(87) PCT Pub. No.: WO2019/245534
PCT Pub. Date: Dec. 26, 2019

(65) Prior Publication Data
US 2021/0402682 A1 Dec. 30, 2021

(51) Int. Cl.
*B29C 64/165* (2017.01)
*B33Y 70/00* (2020.01)
(Continued)

(52) U.S. Cl.
CPC .......... *B29C 64/165* (2017.08); *B29C 64/264* (2017.08); *B33Y 10/00* (2014.12);
(Continued)

(58) Field of Classification Search
None
See application file for complete search history.

(56) References Cited

U.S. PATENT DOCUMENTS

| 6,245,281 B1 | 6/2001 | Scholten et al. |
| 9,676,952 B2 | 6/2017 | Breton et al. |

(Continued)

FOREIGN PATENT DOCUMENTS

| CN | 104559105 A | 4/2015 |
| CN | 105504801 A | 4/2016 |

(Continued)

OTHER PUBLICATIONS

Amado, A. et al., "Advances In Sls Powder Characterization" Aug. 17, 2011, 15 pages.
(Continued)

*Primary Examiner* — Mary Lynn F Theisen
(74) *Attorney, Agent, or Firm* — Dierker & Kavanaugh PC

(57) ABSTRACT

An example of a three-dimensional (3D) printing kit includes a build material composition and a fusing agent to be applied to at least a portion of the build material composition during 3D printing. The build material composition includes a polyamide having: an avalanche angle ranging from about 35 degrees to about 55 degrees; a break energy ranging from about 25 kJ/kg to about 57 kJ/kg; and an avalanche energy ranging from about 7 kJ/kg to about 22 kJ/kg. The fusing agent includes an energy absorber to absorb electromagnetic radiation to coalesce the polyamide in the at least the portion.

15 Claims, 11 Drawing Sheets

(51) Int. Cl.
*B33Y 10/00* (2015.01)
*B29C 64/264* (2017.01)
*B29K 77/00* (2006.01)

(52) U.S. Cl.
CPC .......... *B33Y 70/00* (2014.12); *B29K 2077/00* (2013.01); *B29K 2995/0063* (2013.01)

(56) References Cited

U.S. PATENT DOCUMENTS

| | | |
|---|---|---|
| 10,814,549 B2 | 10/2020 | Zhao et al. |
| 2004/0102539 A1 | 5/2004 | Monsheimer et al. |
| 2004/0106691 A1 | 6/2004 | Monsheimer et al. |
| 2005/0027050 A1 | 2/2005 | Monsheimer et al. |
| 2006/0071359 A1 | 4/2006 | Monsheimer et al. |
| 2009/0236775 A1 | 9/2009 | Monsheimer et al. |
| 2011/0052927 A1 | 3/2011 | Martinoni et al. |
| 2011/0237731 A1 | 9/2011 | Paternoster |
| 2012/0041132 A1 | 2/2012 | Monsheimer et al. |
| 2014/0371364 A1 | 12/2014 | Monsheimer et al. |
| 2015/0251353 A1 | 9/2015 | Rodgers et al. |
| 2016/0244628 A1 | 8/2016 | Breton et al. |
| 2018/0009982 A1 | 1/2018 | Steele et al. |
| 2018/0036938 A1 | 2/2018 | Baumann et al. |
| 2018/0057691 A1 | 3/2018 | Li et al. |
| 2020/0262146 A1 | 8/2020 | Barnes |
| 2021/0339467 A1 | 11/2021 | Fleischmann et al. |

FOREIGN PATENT DOCUMENTS

| | | |
|---|---|---|
| CN | 105884981 A | 8/2016 |
| CN | 106977809 A | 7/2017 |
| CN | 107353644 A | 11/2017 |
| CN | 107698709 A | 2/2018 |
| EP | 2352636 A2 | 8/2011 |
| EP | 2664442 B1 | 11/2013 |
| JP | 2014178531 A | 9/2014 |
| WO | 2007/114895 A2 | 10/2007 |
| WO | 2014/089708 A1 | 6/2014 |
| WO | 2016/175813 A1 | 11/2016 |
| WO | 2017/014784 | 1/2017 |
| WO | WO2017014785 A1 | 1/2017 |
| WO | 2017/069778 A1 | 4/2017 |
| WO | WO2017127061 A1 | 7/2017 |
| WO | WO2018045043 A1 | 3/2018 |
| WO | WO2018080456 A1 | 5/2018 |

OTHER PUBLICATIONS

Ziegelmeierm, Stefan et al., "Characterizing the Bulk & Flow Behaviour of LS Polymer Powders" Aug. 16, 2013, 14 pages.

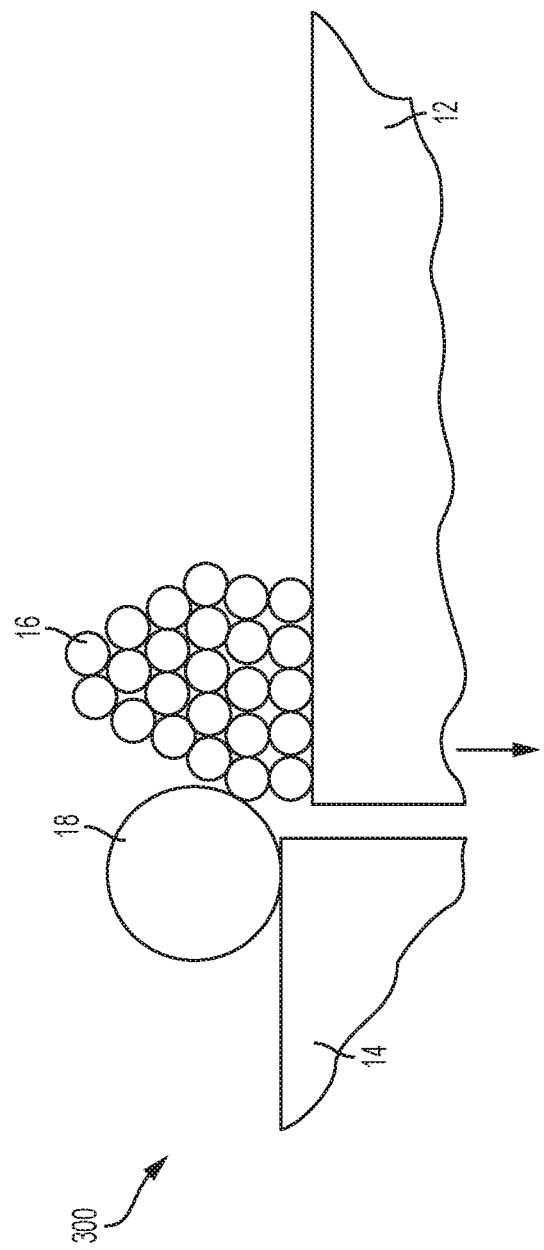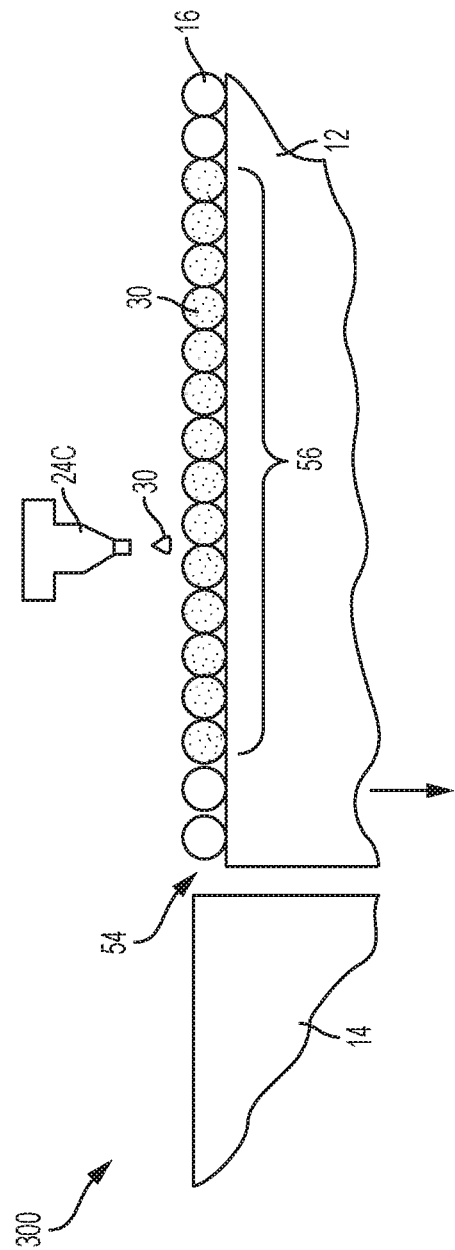

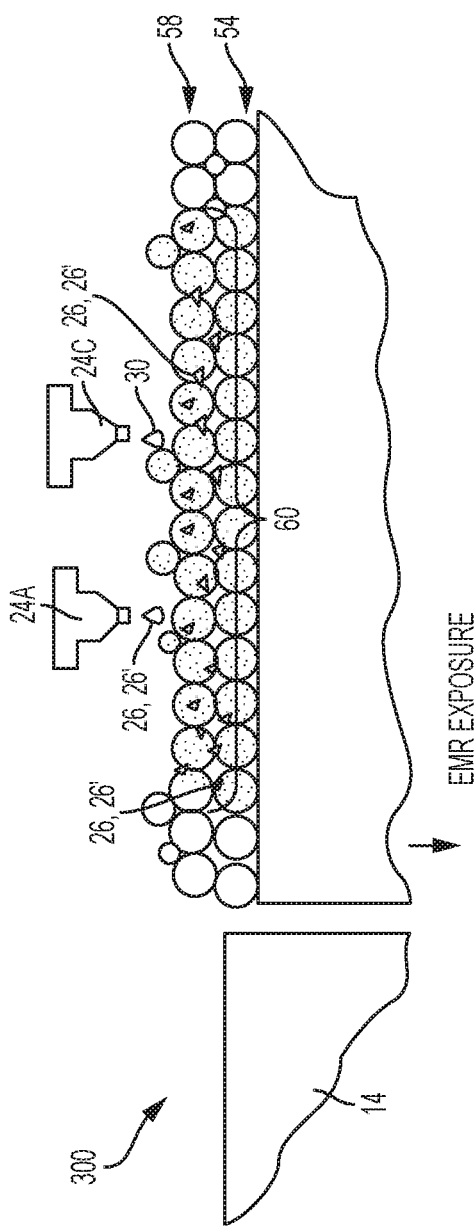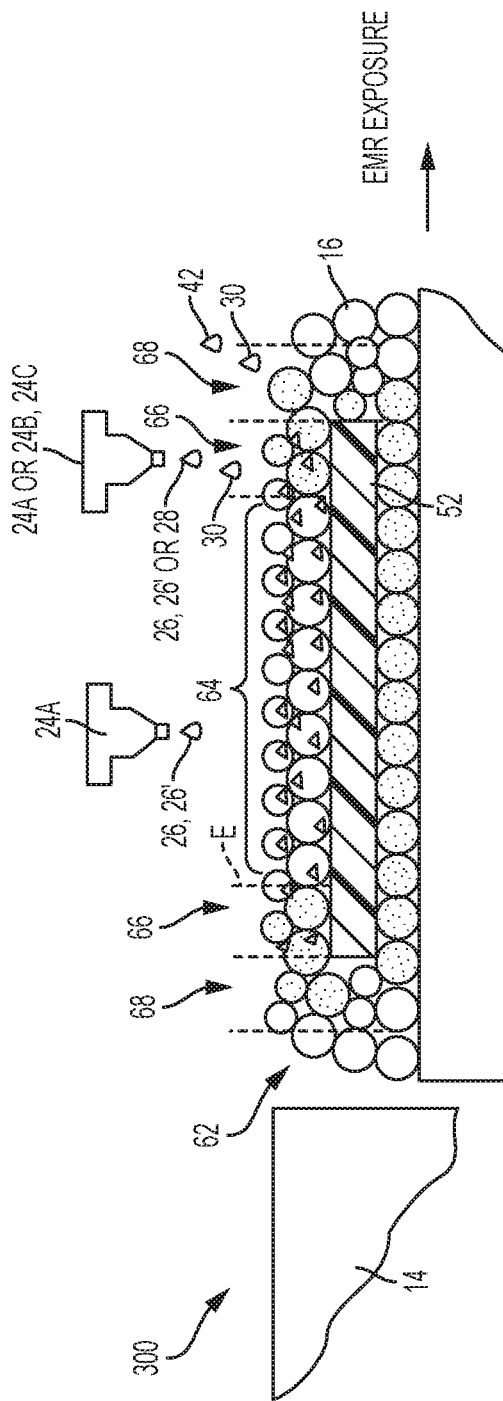

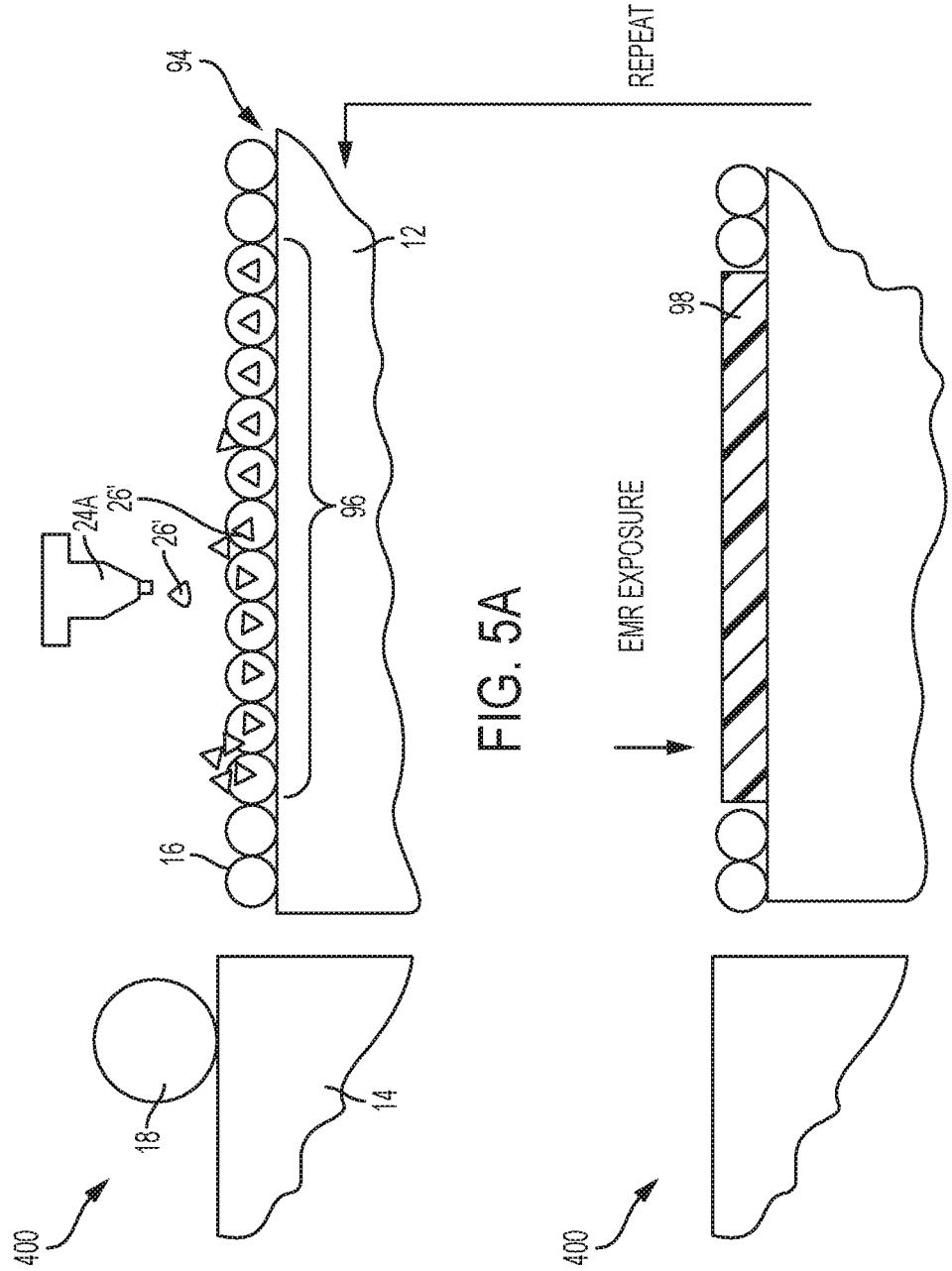

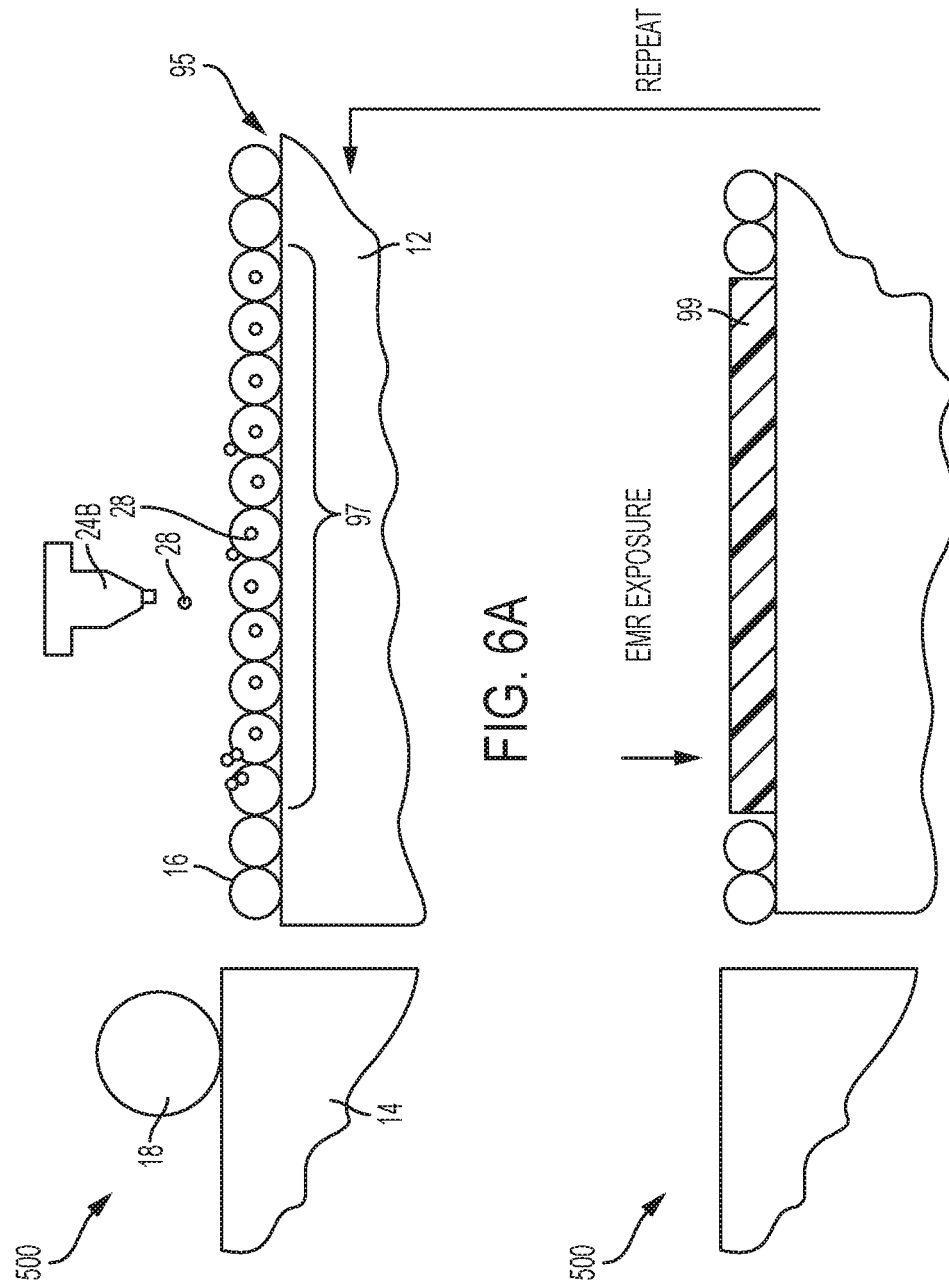

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 4A through 4H are schematic views depicting the formation of a part using an example of the 3D printing methods disclosed herein;

FIGS. 5A through 5C are schematic views depicting the formation of a part using another example of the 3D printing methods disclosed herein;

FIGS. 6A and 6B are schematic views depicting the formation of a part using still another example of the 3D printing methods disclosed herein.

DETAILED DESCRIPTION

Figure 1:
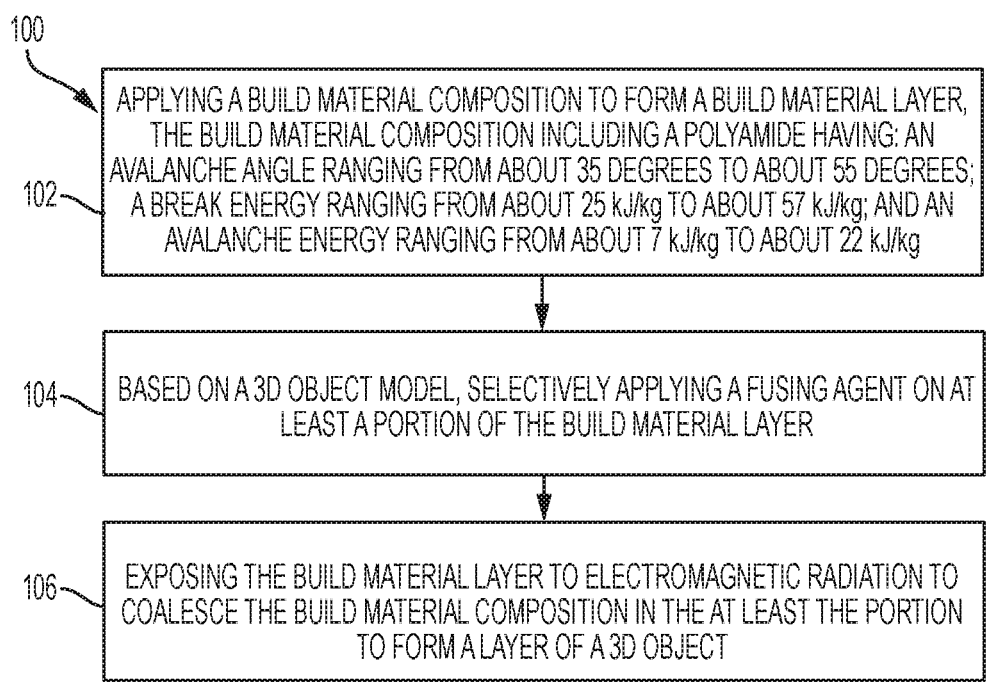
FIG. 1 is a flow diagram illustrating an example of a method for 3D printing.

Some examples of three-dimensional (3D) printing may utilize a fusing agent (including an energy absorber) to pattern polymeric build material. In these examples, an entire layer of the polymeric build material is exposed to radiation, but the patterned region (which, in some instances, is less than the entire layer) of the polymeric build material is coalesced/fused and hardened to become a layer of a 3D object. In the patterned region, the fusing agent is capable of at least partially penetrating into voids between the polymeric build material particles, and is also capable of spreading onto the exterior surface of the polymeric build material particles. This fusing agent is capable of absorbing radiation and converting the absorbed radiation to thermal energy, which in turn coalesces/fuses the polymeric build material that is in contact with the fusing agent. Coalescing/fusing causes the polymeric build material to join or blend to form a single entity (i.e., the layer of the 3D object). Coalescing/fusing may involve at least partial thermal merging, melting, binding, and/or some other mechanism that coalesces the polymeric build material to form the layer of the 3D object.

In these examples of 3D printing, the polymeric build material, the fusing agent, the radiation exposure process, etc., may be selected so that the patterned build material is able to coalesce/fuse to form a mechanically strong 3D object, while the non-patterned build material remains non-coalesced/non-fused when exposed to the radiation. Some polymeric build materials, which may be used in other fabrication methods (e.g., injection molding, selective laser sintering (SLS), selective laser melting (SLM), etc.), may be incompatible with the fusing agent and/or the radiation exposure process. For example, some polymeric build materials may be unable to sufficiently coalesce/fuse to form a mechanically strong 3D object when patterned with the fusing agent and exposed to the radiation. For another example, some polymeric build materials may over coalesce/fuse when patterned with the fusing agent and exposed to the radiation, which can form a brittle 3D object.

Further, some polymeric build materials, which may be used in other fabrication methods, may have insufficient flowability and may be unable to be spread into substantially uniform build material layers. Build material layers that are not substantially uniform may cause the formation of voids within the 3D object, which may deleteriously affect the mechanical strength of the 3D object. Further, insufficient spreading of the build material may cause over coalescing/fusing, which may form a brittle 3D object. Build material layers that are not substantially uniform may also deleteriously affect the surface finish quality and/or accuracy of the 3D object. For example, the surface may be undesirably rough and/or may have an undesirable appearance. As another example, the 3D object or regions thereof may be larger or smaller than intended.

Build Material Compositions

Disclosed herein is a build material composition that includes a polyamide having: an avalanche angle ranging from about 35 degrees to about 55 degrees; a break energy ranging from about 25 kJ/kg to about 57 kJ/kg; and an avalanche energy ranging from about 7 kJ/kg to about 22 kJ/kg.

As used herein, the "avalanche angle" is the angle of the polyamide at the maximum power prior to the start of an avalanche occurrence. Also as used herein, the "break energy" is the amount of energy a powder sample in a rotating drum can accumulate before a powder avalanche occurs. Still further, as used herein, the "avalanche energy" is the energy that is lost as a result of an avalanche occurrence. In other words, the avalanche energy may be the difference between the break energy and the energy after the avalanche occurrence is over and the powder is at rest. The avalanche energy may be referred to as the energy between polyamide stick and slip events during avalanching.

It has been found that polyamides with these characteristics are compatible with the fusing agent and/or the radiation exposure process disclosed herein. These polyamides are able to sufficiently fuse/coalesce to form a mechanically strong 3D object when patterned with the fusing agent and exposed to the radiation. Further, these polyamides have sufficient flowability and are able to be spread into substantially uniform build material layers. As such, the polyamides disclosed herein tend to not over-fuse/coalesce or under-fuse/coalesce. Therefore, these polyamide build materials may be successfully used in commercially available 3D printers (i.e., those that utilize fusing agent(s) and radiation exposure) to generate mechanically strong 3D parts, without having to make adjustments to the mechanical parts of the printer (e.g., to achieve spreading) and/or the printing agents of the printer. The energy exposure settings of the printer may or may not be adjusted, depending, in part on the type of build material that had previously been used in the printer.

In some examples, the build material composition consists of the polyamide. In other examples, the build material composition may include additional components, such as a filler, an antioxidant, a whitener, an antistatic agent, a flow aid, or a combination thereof.

The polyamide may be any polyamide that has an avalanche angle ranging from about 35 degrees to about 55 degrees, a break energy ranging from about 25 kJ/kg to about 57 kJ/kg, and an avalanche energy ranging from about 7 kJ/kg to about 22 kJ/kg. In some examples, the polyamide is selected from the group consisting of polyamide 12 (PA 12/nylon 12), polyamide 12-GB (PA 12-GB/nylon 12-GB), polyamide 11 (PA 11/nylon 11), polyamide 6 (PA 6/nylon 6), polyamide 13 (PA 13/nylon 13), polyamide 6,13 (PA 6,13/nylon 6,13), and a combination thereof. It is to be understood that polyamide 12-GB refers to a polyamide 12 including glass beads or another form of glass disclosed herein (mixed therewith or encapsulated therein, e.g., at a weight ratio of the glass to the polyamide 12 within the ranges set forth herein).

As mentioned above, the polyamide has an avalanche angle ranging from about 35 degrees to about 55 degrees. In an example, the polyamide is a polyamide 12 and the avalanche angle ranges from about 36 degrees to about 40 degrees. In another example, the polyamide is a polyamide 11 and the avalanche angle ranges from about 44 degrees to about 52 degrees. In still another example, the polyamide is a polyamide 12-GB and the avalanche angle ranges from about 40 degrees to about 48 degrees. In yet another example, the polyamide is a polyamide 6,13 and the avalanche angle ranges from about 38 degrees to about 45 degrees.

As also mentioned above, the polyamide has a break energy ranging from about 25 kJ/kg to about 57 kJ/kg. In an example, the polyamide is a polyamide 12 and the break energy ranges from about 27 kJ/kg to about 37 kJ/kg. In another example, the polyamide is a polyamide 11 and the break energy ranges from about 38 kJ/kg to about 57 kJ/kg. In still another example, the polyamide is a polyamide 12-GB and the break energy ranges from about 32 kJ/kg to about 50 kJ/kg. In yet another example, the polyamide is a polyamide 6,13 and the break energy ranges from about 28 kJ/kg to about 40 kJ/kg.

As also mentioned above, the polyamide has an avalanche energy ranging from about 7 kJ/kg to about 22 kJ/kg. In an example, the polyamide is a polyamide 12 and the avalanche energy ranges from about 7 kJ/kg to about 17 kJ/kg. In another example, the polyamide is a polyamide 11 and the avalanche energy ranges from about 8 kJ/kg to about 22 kJ/kg. In still another example, the polyamide is a polyamide 12-GB and the avalanche energy ranges from about 7 kJ/kg to about 19 kJ/kg. In yet another example, the polyamide is a polyamide 6,13 and the avalanche energy ranges from about 8 kJ/kg to about 15 kJ/kg.

As also mentioned above, having an avalanche angle ranging from about 35 degrees to about 55 degrees, a break energy ranging from about 25 kJ/kg to about 57 kJ/kg, and an avalanche energy ranging from about 7 kJ/kg to about 22 kJ/kg may enable the polyamide to be compatible with the fusing agent and the radiation exposure process and to have sufficient flowability. As such, the polyamide may be successfully used in 3D printing processes and printers that use a fusing agent and radiation exposure.

In some examples, the polyamide further has a dynamic density within about 15% of a bulk density of the polyamide. In other words, the polyamide may have a dynamic density that is ±(plus or minus) about 15% of the bulk density of the polyamide. The dynamic density is the density of the polyamide while the polyamide is rotating in a drum or cylinder.

In some examples, the dynamic density of the polyamide may range from about 0.3 g/cc to about 0.5 g/cc. In an example, the polyamide is a polyamide 12 having a dynamic density ranging from about 0.34 g/cc to about 0.38 g/cc. In another example, the polyamide is a polyamide 11 having a dynamic density ranging from about 0.44 g/cc to about 0.48 g/cc. In still another example, the polyamide is a polyamide 12-GB having a dynamic density ranging from about 0.42 g/cc to about 0.49 g/cc. in yet another example, the polyamide is a polyamide 6,13 having a dynamic density ranging from about 0.43 g/cc to about 0.48 g/cc.

Each of these properties (i.e., the avalanche angle, the break energy, the avalanche energy, and the dynamic density) may be measured in an instrument, such as the REVOLUTION™ Powder Analyzer from Mercury Scientific Inc. This type of instrument includes a drum that rotates the powder (at a user selected revolution rate and for a user selected time), and collects digital images of the powder during the rotation process. This instrument measures the behavior of the powder from the digital images. Instruments that are capable of measuring these properties may analyze samples ranging from 10 cubic centimeters (cc or $cm^3$) to 500 cc at a rotation (or revolution) rate ranging from 0.1 rotations per minute (RPM) to 200 RPM, an imaging rate of up 30 frames per second (FPS), and a prep time ranging from 0 seconds to 999 seconds. These instruments may also be capable of measuring the properties of powders at room temperature (e.g., a temperature ranging from about 18° C. to about 25° C.) or at temperatures above 25° C. and up to about 200° C. In an example, the avalanche angle, the break energy, the avalanche energy, and/or the dynamic density of the polyamide may be measured over 100 avalanches at room temperature (e.g., a temperature ranging from about 18° C. to about 25° C.) using a 100 cc sample of the polyamide, a rotation (or revolution) rate of 0.3 RPM, an imaging rate of 10 FPS, a prep time of 60 seconds, and an avalanche threshold of 0.65%. While the properties of the polyamide may be analyzed using other parameters, it is to be understood that, as used herein, any avalanche angle, any break energy, any avalanche energy, and any dynamic density is in relation to 100 avalanches at room temperature using a 100 cc sample of the polyamide, a rotation (or revolution) rate of 0.3 RPM, an imaging rate of 10 FPS, a prep time of 60 seconds, and an avalanche threshold of 0.65%.

In some examples, the polyamide may be in the form of a powder. In other examples, the polyamide may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polyamide may be made up of similarly sized particles and/or differently sized particles. In an example, the average particle size of the polyamide ranges from about 2 µm to about 200 µm. In another example, the average particle size of the polyamide ranges from about 10 µm to about 110 µm. The term "average particle size", as used herein, may refer to a number-weighted mean diameter or a volume-weighted mean diameter of a particle distribution.

The polyamide may have a wide processing window of greater than 5° C., which can be defined by the temperature range between the melting point and the re-crystallization temperature. As examples, the polyamide may have a melting point ranging from about 250° C. to about 225° C., from about 155° C. to about 215° C., about 160° C. to about 200° C., from about 170° C. to about 190° C., or from about 182° C. to about 189° C. As another example, the polyamide may have a melting point of about 180° C.

In some examples, the polyamide does not substantially absorb radiation having a wavelength within the range of 400 nm to 1400 nm. In other examples, the polyamide does not substantially absorb radiation having a wavelength within the range of 800 nm to 1400 nm. In still other examples, the polyamide does not substantially absorb radiation having a wavelength within the range of 400 nm to 1200 nm. In these examples, the polyamide may be considered to reflect the wavelengths at which the polyamide does not substantially absorb radiation. The phrase "does not substantially absorb" means that the absorptivity of the polyamide at a particular wavelength is 25% or less (e.g., 20%, 10%, 5%, etc.).

In some examples, the polyamide may also include glass therein (e.g., when the polyamide is a polyamide 12-GB). In some of these examples, the glass may be dry blended with the polyamide. In others of these examples, the glass may be encapsulated by the polyamide. When the glass is encapsulated by the polyamide, the polyamide may form a continuous coating (i.e., none of the glass is exposed) or a substantially continuous coating (i.e., 5% or less of the glass is exposed) on the glass.

Whether the glass is dry blended with the polyamide or encapsulated by the polyamide may depend, in part, on (i) the characteristics of the glass, and (ii) the 3D printer with which the build material composition is to be used. As an example, when the glass includes glass fibers and/or crushed glass, the glass may be encapsulated by the polyamide. As another example, when segregation of dry blended polyamide and glass may occur and cause damage to the 3D printer in which the build material composition is to be used, the glass may be encapsulated by the polyamide.

When the glass is dry blended with the polyamide, the average particle size of the glass may range from about 5 µm to about 100 µm.

When the glass is encapsulated by the polyamide, the average particle size of the glass (prior to being coated) may range from about 5 µm to about 100 µm or from about 30 µm to about 50 µm. The average particle size of the encapsulated material (i.e., the glass coated with the polyamide) may depend upon the size of the glass prior to coating and the thickness of the polyamide that is applied to the glass. In an example, the average particle size of the encapsulated build material may range from about 10 µm to about 200 µm. In another example, the average particle size of the encapsulated build material may range from about 20 µm to about 120 µm.

The weight ratio of the glass to the polyamide (e.g., polyamide 12) may range from about 5:95 to about 60:40. In some examples, the weight ratio of the glass to the polyamide may range from about 10:90 to about 60:40; or from about 20:80 to about 60:40; or from about 40:60 to about 60:40; or from about 5:95 to about 40:60; or from about 5:95 to about 50:50. In some instances, additives (e.g., antioxidant(s), whitener(s), charging agent(s), flow aid(s), etc.) may be included with the polyamide and glass. In these instances, the weight of the polyamide, for the purpose of determining the weight ratio of the glass to the polyamide, may include the weight of the additives in addition to the weight of the polymer. In other instances, the weight of the polyamide, for the purpose of determining the weight ratio of the glass to the polyamide, includes the weight of the polymer alone (whether or not additives are included in the build material composition). The weight ratio of the glass to the polyamide may depend, in part, on the desired properties of the 3D object to be formed, the glass used, the polyamide used, and/or the additives included in the polyamide.

In one example, the glass may be selected from the group consisting of solid glass beads, hollow glass beads, porous glass beads, glass fibers, crushed glass, and a combination thereof. In another example, the glass may be selected from the group consisting of soda lime glass ($Na_2O/CaO/SiO_2$), borosilicate glass, phosphate glass, fused quartz, and a combination thereof. In still another example, the glass may be selected from the group consisting of soda lime glass, borosilicate glass, and a combination thereof. In yet other examples, the glass may be any type of non-crystalline silicate glass.

In some examples, a surface of the glass may be modified with a functional group selected from the group consisting of an acrylate functional silane, a methacrylate functional silane, an epoxy functional silane, an ester functional silane, an amino functional silane, and a combination thereof. Examples of the glass modified with such functional groups and/or such functional groups that may be used to modify the glass are available from Potters Industries, LLC (e.g., an epoxy functional silane or an amino functional silane), Gelest, Inc. (e.g., an acrylate functional silane or a methacrylate functional silane), Sigma-Aldrich (e.g., an ester functional silane), etc. In an example, the surface of the glass is modified with an amino functional silane. In another example, the surface of the glass may be modified with an epoxy functional silane. In other examples, a surface of the glass is not modified with any functional group.

In some examples, the build material composition, in addition to the polyamide (and in some instances the glass), may include a filler, an antioxidant, a whitener, an antistatic agent, a flow aid, or a combination thereof. While several examples of these additives are provided, it is to be understood that these additives are selected to be thermally stable (i.e., will not decompose) at the 3D printing temperatures.

Filler(s) may be added to the build material composition to modify the properties of the 3D parts to be printed. Examples of suitable fillers include alumina, silica, talc, and a combination thereof. In an example, the filler may be included in the build material composition in an amount ranging from about 1 wt % to about 60 wt %, based on the total weight of the build material composition.

Antioxidant(s) may be added to the build material composition to prevent or slow molecular weight decreases of the polyamide and/or may prevent or slow discoloration (e.g., yellowing) of the polyamide by preventing or slowing oxidation of the polyamide. In some examples, the antioxidant may discolor upon reacting with oxygen, and this discoloration may contribute to the discoloration of the build material composition. The antioxidant may be selected to minimize discoloration. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 µm or less) that are dry blended with the polyamide. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Whitener(s) may be added to the build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition in an amount ranging from greater than 0 wt % to about 10 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 µm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

In some examples, the build material composition disclosed herein may be reused/recycled. After a print cycle, some of the build material composition disclosed herein remains non-coalesced/non-fused, and can be reclaimed and used again. This reclaimed build material is referred to as the recycled build material composition. The recycled build material composition may be exposed to 2, 4, 6, 8, 10, or more build cycles (i.e., heating to a temperature ranging from about 50° C. to about 205° C. and then cooling), and reclaimed after each cycle. Between cycles, the recycled build material composition may be mixed with at least some fresh or virgin (i.e., not previously used in a 3D printing process) build material composition. In some examples, the weight ratio of the recycled build material composition to the fresh build material composition may be 90:10, 80:20, 70:30, 60:40, 50:50, or 40:60. The weight ratio of the recycled build material composition to the fresh build material composition may depend, in part, on the stability of the build material composition, the discoloration of the recycled build material composition (as compared to the build material composition), the desired aesthetics for the 3D object being formed, the thermal decomposition of the recycled build material composition (as compared to the build material composition), and/or the desired mechanical properties of the 3D object being formed.

3D Printing Kits and Compositions

The build material composition described herein may be part of a 3D printing kit. In an example, the three-dimensional (3D) printing kit, comprises: a build material composition including a polyamide having: an avalanche angle ranging from about 35 degrees to about 55 degrees; a break energy ranging from about 25 kJ/kg to about 57 kJ/kg; and an avalanche energy ranging from about 7 kJ/kg to about 22 kJ/kg; and a fusing agent to be applied to at least a portion of the build material composition during 3D printing, the fusing agent including an energy absorber to absorb electromagnetic radiation to coalesce the polyamide in the at least the portion.

In some examples, the 3D printing kit consists of the build material composition and the fusing agent with no other components. In other examples, the kit includes additional components, such as another fusing agent, a coloring agent, a detailing agent, or a combination thereof. The components of the kit may be maintained separately until used together in examples of the 3D printing method disclosed herein.

Any example of the build material composition may be used in the examples of the 3D printing kit. As mentioned above, the build material composition includes at least the polyamide, and may additionally include the glass, the filler, the antioxidant, the whitener, the antistatic agent, the flow aid, or combinations thereof.

In an example of the 3D printing kit, the polyamide has a dynamic density within about 15% of a bulk density of the polyamide.

In another example of the 3D printing kit, one of: (i) the polyamide is a polyamide 12, the avalanche angle ranges from about 36 degrees to about 40 degrees, the break energy ranges from about 27 kJ/kg to about 37 kJ/kg, and the avalanche energy ranges from about 7 kJ/kg to about 17 kJ/kg; or (ii) the polyamide is a polyamide 11, the avalanche angle ranges from about 44 degrees to about 52 degrees, the break energy ranges from about 38 kJ/kg to about 57 kJ/kg, and the avalanche energy ranges from about 8 kJ/kg to about 22 kJ/kg; or (iii) the polyamide is a polyamide 12-GB, the avalanche angle ranges from about 40 degrees to about 48 degrees, the break energy ranges from about 32 kJ/kg to about 50 kJ/kg, and the avalanche energy ranges from about 7 kJ/kg to about 19 kJ/kg; or (iv) the polyamide is a polyamide 6,13, the avalanche angle ranges from about 38 degrees to about 45 degrees, the break energy ranges from about 28 kJ/kg to about 40 kJ/kg, and the avalanche energy ranges from about 8 kJ/kg to about 15 kJ/kg.

In still another example, one of: (i) the polyamide is a polyamide 12 having a dynamic density ranging from about 0.34 g/cc to about 0.38 g/cc; or (ii) the polyamide is a polyamide 11 having a dynamic density ranging from about 0.44 g/cc to about 0.48 g/cc; or (iii) the polyamide is a polyamide 12-GB having a dynamic density ranging from about 0.42 g/cc to about 0.49 g/cc; or (iv) the polyamide is a polyamide 6,13 having a dynamic density ranging from about 0.43 g/cc to about 0.48 g/cc.

The fusing agent includes at least the energy absorber. In some examples, the fusing agent is a core fusing agent and the energy absorber has absorption at least at wavelengths ranging from 400 nm to 780 nm. The core fusing agent may also have absorption at wavelengths ranging from 800 nm to 4000 nm. In some of these examples, the 3D printing kit further includes a primer fusing agent including a plasmonic resonance absorber having absorption at wavelengths ranging from 800 nm to 4000 nm and having transparency at wavelengths ranging from 400 nm to 780 nm. In other examples, the fusing agent is a primer fusing agent and the energy absorber is a plasmonic resonance absorber having absorption at wavelengths ranging from 800 nm to 4000 nm and having transparency at wavelengths ranging from 400 nm to 780 nm. Example compositions of the fusing agent (e.g., example compositions of the core fusing and example compositions of the primer fusing agent) are described below.

In some examples, the 3D printing kit further comprises a coloring agent selected from the group consisting of a black agent, a cyan agent, a magenta agent, and a yellow agent. In some of these examples the 3D printing kit may include multiple coloring agents. For example, the 3D printing kit may include a coloring agent for each desired color (e.g., black, cyan, magenta, yellow, etc.). Any of the example compositions of the coloring agent described below may be used in the examples of the 3D printing kit.

In some examples, the 3D printing kit further comprises a detailing agent including a surfactant, a co-solvent, and water. Any of the example compositions of the detailing agent described below may be used in the examples of the 3D printing kit.

As used herein, "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

Fusing Agents

In the examples of the 3D printing kit, the 3D printing methods, and the 3D printing system disclosed herein, a fusing agent may be used.

Some examples of the fusing agent have substantial absorption (e.g., 80%) at least in the visible region (400 nm-780 nm). These examples of the fusing agent are referred to as the core fusing agent, or, in some instances, the black fusing agent. As described herein, the energy absorber in the core fusing agent may also absorb energy in the infrared region (e.g., 800 nm to 4000 nm). This absorption generates heat suitable for coalescing/fusing during 3D printing, which leads to 3D objects (or 3D objects regions) having mechanical integrity and relatively uniform mechanical properties (e.g., strength, elongation at break, etc.). This absorption, however, also results in strongly colored, e.g., black, 3D objects (or 3D objects regions). In these examples of the fusing agent, the energy absorber may be referred to as the active material.

Other examples of the fusing agent include a plasmonic resonance absorber having absorption at wavelengths ranging from 800 nm to 4000 nm and having transparency at wavelengths ranging from 400 nm to 780 nm. These examples of the fusing agent are referred to as the primer fusing agent, or, in some instances, the low tint fusing agent. This absorption and transparency allows the primer fusing agent to absorb enough radiation to coalesce/fuse the build material composition in contact therewith while causing the 3D objects (or 3D objects regions) to be white or slightly colored. In these examples of the fusing agent, the energy absorber is the plasmonic resonance absorber.

As used herein "absorption" means that at least 80% of radiation having wavelengths within the specified range is absorbed. Also used herein, "transparency" means that 25% or less of radiation having wavelengths within the specified range is absorbed.

Core Fusing Agents

Some examples of the core fusing agent are dispersions including an energy absorber (i.e., an active material). In some examples, the active material may be an infrared light absorbing colorant. In an example, the active material is a near-infrared light absorber. Any near-infrared colorants, e.g., those produced by Fabricolor, Eastman Kodak, or BASF, Yamamoto, may be used in the core fusing agent. As one example, the core fusing agent may be a printing liquid formulation including carbon black as the active material. Examples of this printing liquid formulation are commercially known as CM997A, 516458, C18928, C93848, C93808, or the like, all of which are available from HP Inc.

As another example, the core fusing agent may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

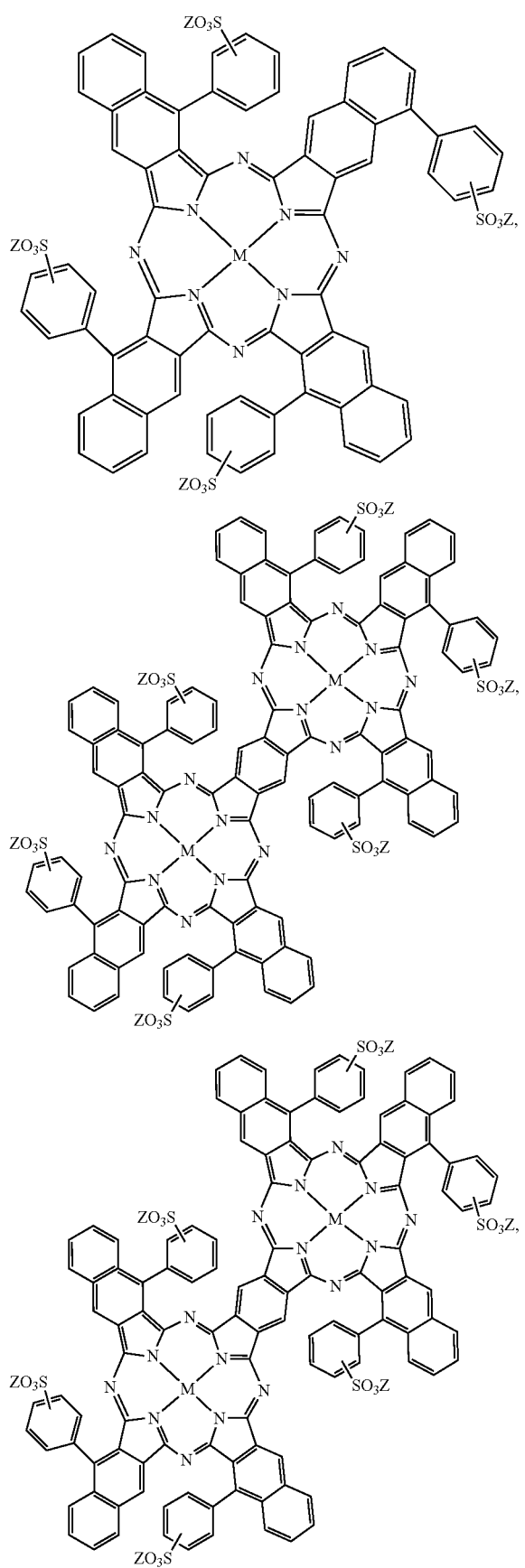

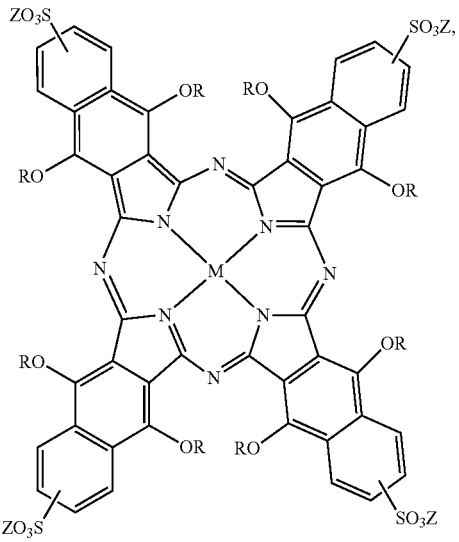

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

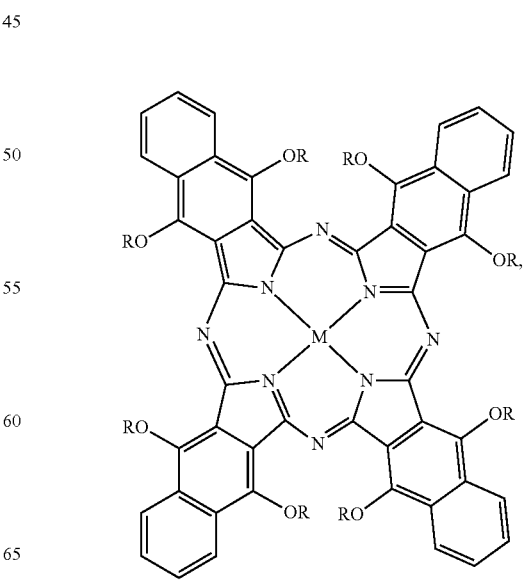

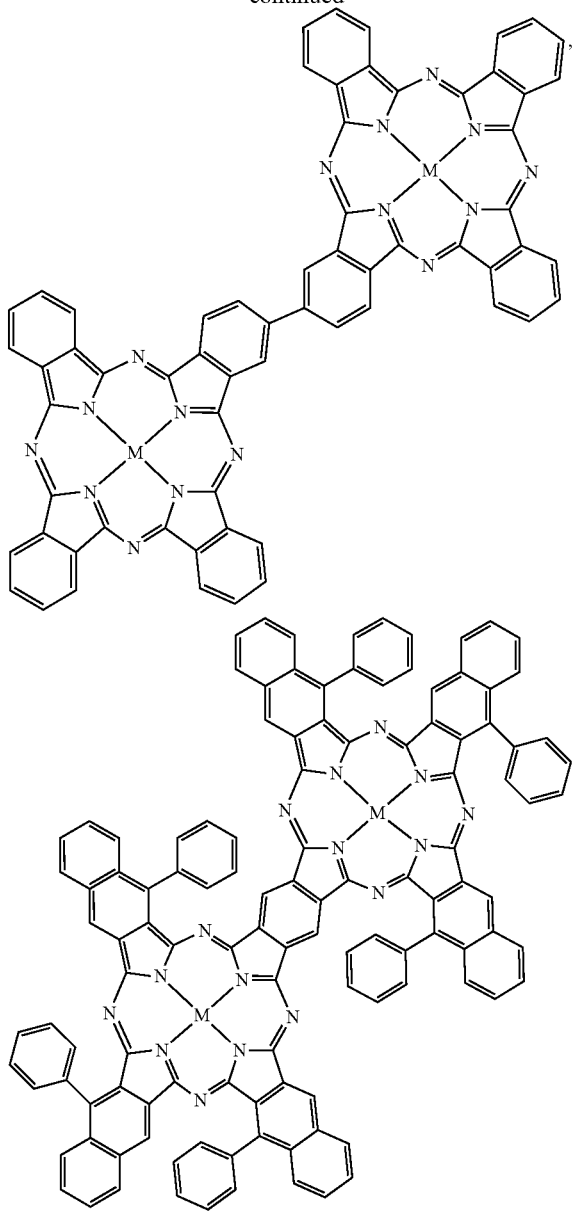

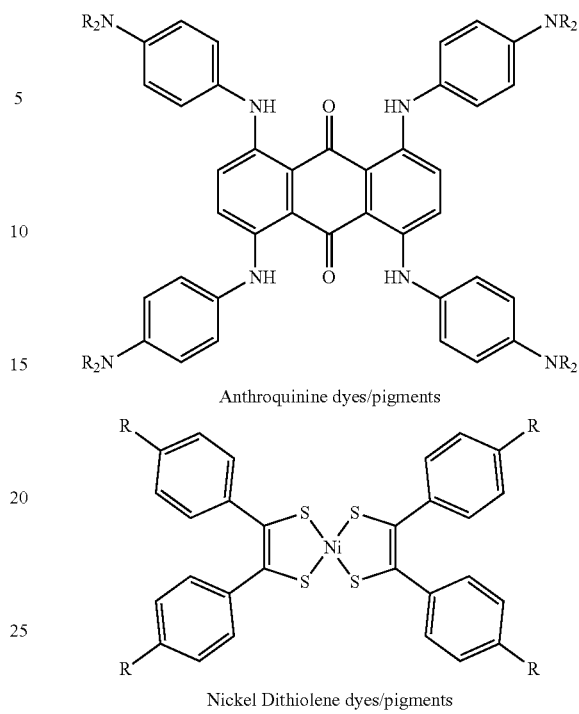

Anthroquinine dyes/pigments

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

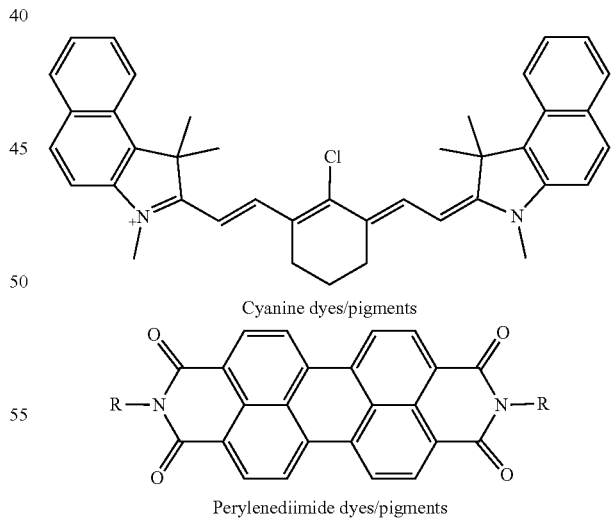

Cyanine dyes/pigments

Perylenediimide dyes/pigments and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

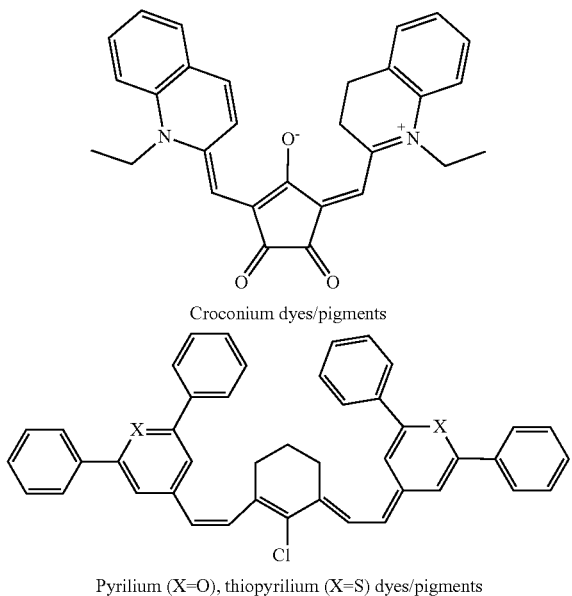

Croconium dyes/pigments

Pyrilium (X=O), thiopyrilium (X=S) dyes/pigments

Boron-dipyrromethene dyes or pigments and aza-boron-dipyrromethene dyes or pigments may have the following structures, respectively:

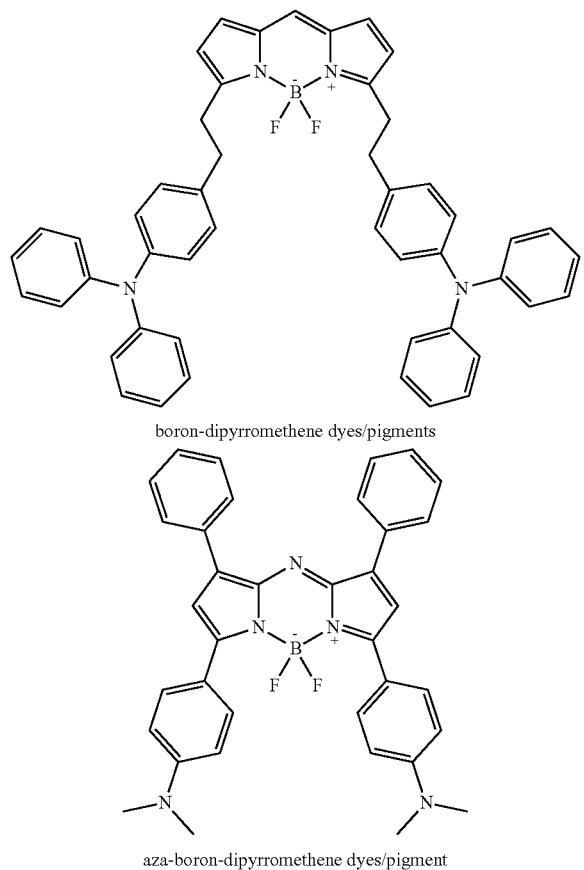

boron-dipyrromethene dyes/pigments aza-boron-dipyrromethene dyes/pigment

The amount of the active material that is present in the core fusing agent ranges from greater than 0 wt % to about 40 wt % based on the total weight of the core fusing agent.

In other examples, the amount of the active material in the core fusing agent ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the core fusing agent having jetting reliability and heat and/or radiation absorbance efficiency.

Primer Fusing Agents

Some examples of the primer fusing agent are dispersions including the plasmonic resonance absorber as the energy absorber. The absorption of the plasmonic resonance absorber is the result of the plasmonic resonance effects. Electrons associated with the atoms of the plasmonic resonance absorber may be collectively excited by radiation, which results in collective oscillation of the electrons. The wavelengths that can excite and oscillate these electrons collectively are dependent on the number of electrons present in the plasmonic resonance absorber particles, which in turn is dependent on the size of the plasmonic resonance absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the primer fusing agent to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example, the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3:SnO_2$, ITO), antimony tin oxide ($Sb_2O_3:SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the plasmonic resonance absorber that is present in the primer fusing agent ranges from greater than 0 wt % to about 40 wt % based on the total weight of the primer fusing agent. In other examples, the amount of the plasmonic resonance absorber in the primer fusing agent ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these plasmonic resonance absorber loadings provide a balance between the primer fusing agent having jetting reliability and heat and/or radiation absorbance efficiency.

The plasmonic resonance absorber may, in some instances, be dispersed with a dispersant. As such, the dispersant helps to uniformly distribute the plasmonic resonance absorber throughout the primer fusing agent. Examples of suitable dispersants include polymer or small molecule dispersants, charged groups attached to the plasmonic resonance absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the primer fusing agent may range from about 10 wt % to about 200 wt % based on the weight of the plasmonic resonance absorber in the primer fusing agent.

A silane coupling agent may also be added to the primer fusing agent to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent may range from about 0.1 wt % to about 50 wt % based on the weight of the plasmonic resonance absorber in the primer fusing agent. In an example, the total amount of silane coupling agent(s) in the primer fusing agent ranges from about 1 wt % to about 30 wt % based on the weight of the plasmonic resonance absorber. In another example, the total amount of silane coupling agent(s) in the primer fusing agent ranges from about 2.5 wt % to about 25 wt % based on the weight of the plasmonic resonance absorber.

One example of the primer fusing agent includes cesium tungsten oxide (CTO) nanoparticles as the plasmonic resonance absorber. The CTO nanoparticles have a formula of $Cs_xWO_3$, where $0<x<1$. The cesium tungsten oxide nanoparticles may give the primer fusing agent a light blue color. The strength of the color may depend, at least in part, on the amount of the CTO nanoparticles in the primer fusing agent. When it is desirable to form an outer white layer on the 3D object, less of the CTO nanoparticles may be used in the primer fusing agent in order to achieve the white color. In an example, the CTO nanoparticles may be present in the primer fusing agent in an amount ranging from about 1 wt % to about 20 wt % (based on the total weight of the primer fusing agent).

The average particle size (e.g., volume-weighted mean diameter) of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent may also include a zwitterionic stabilizer. The zwitterionic stabilizer may improve the stabilization of this example of the primer fusing agent. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent.

Examples of suitable zwitterionic stabilizers include $C_2$ to $C_8$ betaines, $C_2$ to $C_8$ aminocarboxylic acids having a solubility of at least 10 g in 100 g of water, taurine, and combinations thereof. Examples of the $C_2$ to $C_8$ aminocarboxylic acids include beta-alanine, gamma-aminobutyric acid, glycine, and combinations thereof.

The zwitterionic stabilizer may be present in the primer fusing agent in an amount ranging from about 2 wt % to about 35 wt % (based on the total weight of the primer fusing agent). When the zwitterionic stabilizer is the $C_2$ to $C_8$ betaine, the $C_2$ to $C_8$ betaine may be present in an amount ranging from about 8 wt % to about 35 wt % of the total weight of the primer fusing agent. When the zwitterionic stabilizer is the $C_2$ to $C_8$ aminocarboxylic acid, the $C_2$ to $C_8$ aminocarboxylic acid may be present in an amount ranging from about 2 wt % to about 20 wt % of the total weight of the primer fusing agent. When the zwitterionic stabilizer is taurine, taurine may be present in an amount ranging from about 2 wt % to about 35 wt % of the total weight of the primer fusing agent.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Fusing Agent Vehicles

As used herein, "FA vehicle" may refer to the liquid in which the energy absorber (e.g., the active material or the plasmonic resonance absorber) is dispersed or dissolved to form the fusing agent (e.g., the core fusing agent or the primer fusing agent). A wide variety of FA vehicles, including aqueous and non-aqueous vehicles, may be used in the fusing agent. In some examples, the FA vehicle may include water alone or a non-aqueous solvent alone with no other components. In other examples, the FA vehicle may include other components, depending, in part, upon the applicator that is to be used to dispense the fusing agent. Examples of other suitable fusing agent components include co-solvent(s), humectant(s), surfactant(s), antimicrobial agent(s), anti-kogation agent(s), and/or chelating agent(s).

The solvent of the fusing agent may be water or a non-aqueous solvent (e.g., ethanol, acetone, n-methyl pyrrolidone, aliphatic hydrocarbons, etc.). In some examples, the fusing agent consists of the energy absorber and the solvent (without other components). In these examples, the solvent makes up the balance of the fusing agent.

Classes of organic co-solvents that may be used in a water-based fusing agent include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the fusing agent in a total amount ranging from about 1 wt % to about 50 wt % based upon the total weight of the fusing agent, depending upon the jetting architecture of the applicator. In an example, the total amount of the co-solvent(s) present in the fusing agent is 25 wt % based on the total weight of the fusing agent.

The co-solvent(s) of the fusing agent may depend, in part, upon the jetting technology that is to be used to dispense the fusing agent. For example, if thermal inkjet printheads are to be used, water and/or ethanol and/or other longer chain alcohols (e.g., pentanol) may be the solvent (i.e., makes up 35 wt % or more of the fusing agent) or co-solvents. For another example, if piezoelectric inkjet printheads are to be used, water may make up from about 25 wt % to about 30 wt % of the fusing agent, and the solvent (i.e., 35 wt % or more of the fusing agent) may be ethanol, isopropanol, acetone, etc. The co-solvent(s) of the fusing agent may also depend, in part, upon the build material composition that is being used with the fusing agent. For a hydrophobic powder (such as the polyamides disclosed herein), the FA vehicle may include a higher solvent content in order to improve the flow of the fusing agent into the build material composition.

The FA vehicle may also include humectant(s). In an example, the total amount of the humectant(s) present in the fusing agent ranges from about 3 wt % to about 10 wt %, based on the total weight of the fusing agent. An example of a suitable humectant is ethoxylated glycerin having the following formula:

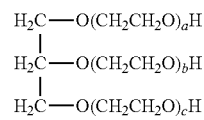

in which the total of a+b+c ranges from about 5 to about 60, or in other examples, from about 20 to about 30. An example of the ethoxylated glycerin is LIPON IC® EG-1 (LEG-1, glycereth-26, a+b+c=26, available from Lipo Chemicals).

In some examples, the FA vehicle includes surfactant(s) to improve the jettability of the fusing agent. Examples of suitable surfactants include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Industries).

Whether a single surfactant is used or a combination of surfactants is used, the total amount of surfactant(s) in the fusing agent may range from about 0.01 wt % to about 10 wt % based on the total weight of the fusing agent. In an example, the total amount of surfactant(s) in the fusing agent may be about 3 wt % based on the total weight of the fusing agent.

An anti-kogation agent may be included in the fusing agent that is to be jetted using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent may range from greater than 0.20 wt % to about 0.65 wt % based on the total weight of the fusing agent. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The FA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™

(Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the fusing agent may include a total amount of antimicrobial agents that ranges from about 0.05 wt % to about 1 wt %. In an example, the antimicrobial agent(s) is/are a biocide(s) and is/are present in the fusing agent in an amount of about 0.25 wt % (based on the total weight of the fusing agent).

Chelating agents (or sequestering agents) may be included in the FA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent may range from greater than 0 wt % to about 2 wt % based on the total weight of the fusing agent. In an example, the chelating agent(s) is/are present in the fusing agent in an amount of about 0.04 wt % (based on the total weight of the fusing agent).

Coloring Agents

In the examples of the 3D printing kit, the 3D printing methods, and the 3D printing system disclosed herein, a coloring agent may be used. The coloring agent may include a colorant, a co-solvent, and a balance of water. In some examples, the coloring agent consists of these components, and no other components. In some other examples, the coloring agent may further include a binder (e.g., an acrylic latex binder, which may be a copolymer of any two or more of styrene, acrylic acid, methacrylic acid, methyl methacrylate, ethyl methacrylate, and butyl methacrylate) and/or a buffer. In still other examples, the coloring agent may further include additional components, such as dispersant(s), humectant(s), surfactant(s), anti-kogation agent(s), antimicrobial agent(s), and/or chelating agent(s) (each of which is described above in reference to the fusing agent).

The coloring agent may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

In some instances, the colorant of the coloring agent may be transparent to infrared wavelengths. In other instances, the colorant of the coloring agent may not be completely transparent to infrared wavelengths, but does not absorb enough radiation to sufficiently heat the build material composition in contact therewith. In an example, the colorant absorbs less than 10% of radiation having wavelengths in a range of 650 nm to 2500 nm. In another example, the colorant absorbs less than 20% of radiation having wavelengths in a range of 650 nm to 4000 nm.

The colorant of the coloring agent is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the energy absorber in the fusing agent, which absorbs wavelengths within the near-infrared spectrum and/or the infrared spectrum (e.g., the fusing agent absorbs 80% or more of radiation with wavelengths within the near-infrared spectrum and/or the infrared spectrum). As such, the colorant in the coloring agent will not substantially absorb the fusing radiation, and thus will not initiate coalescing/fusing of the build material composition in contact therewith when the build material composition is exposed to the fusing radiation.

Examples of IR transparent colorants include acid yellow 23 (AY 23), AY17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s).

Examples of black dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

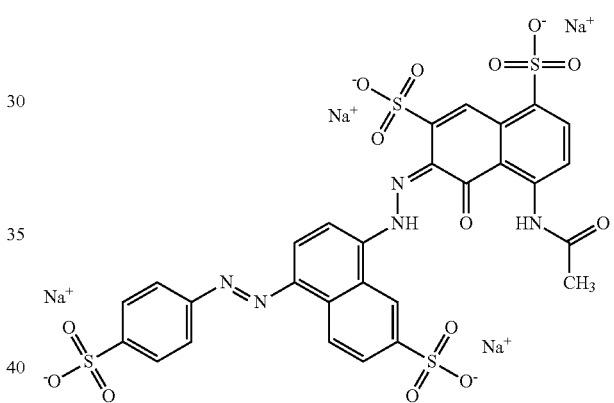

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

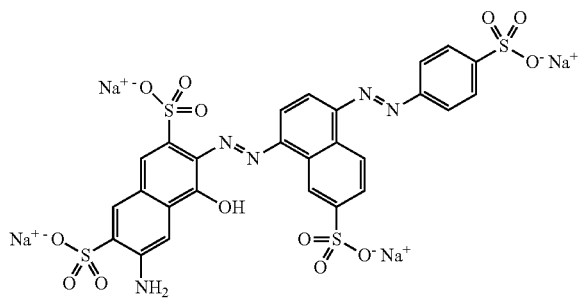

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

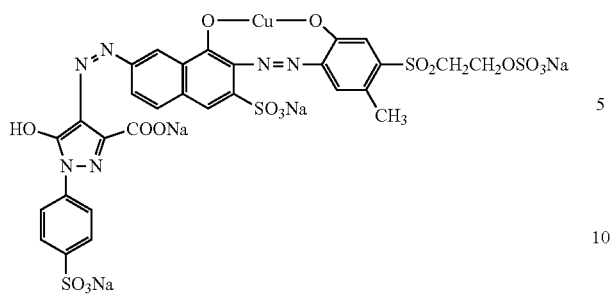

(commercially available as Reactive Black 31); tetrasodium (6E)-4-amino-5-oxo-3-[[4-(2-sulfonatooxyethylsulfonyl) phenyl]diazenyl]-6-[[4-(2-sulfonatooxyethylsulfonyl)phenyl]hydrazinylidene]naphthalene-2,7-disulfonate with a chemical structure of:

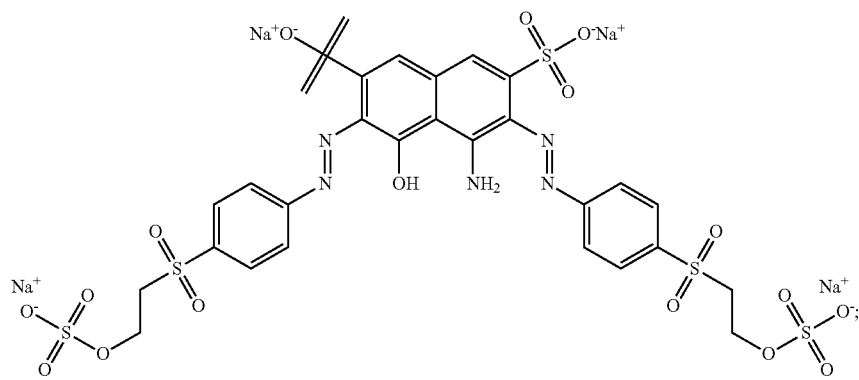

and combinations thereof. Some other commercially available examples of black dyes include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

Examples of cyan dyes include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

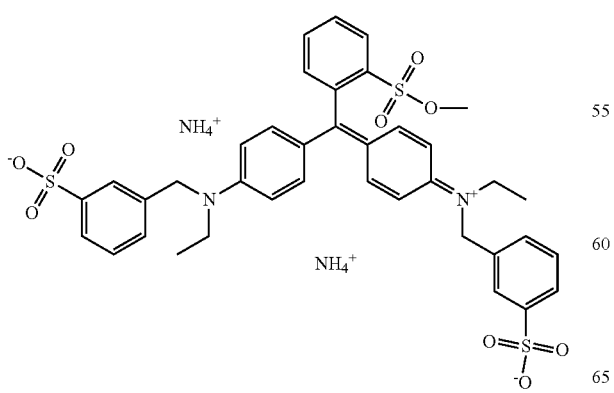

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

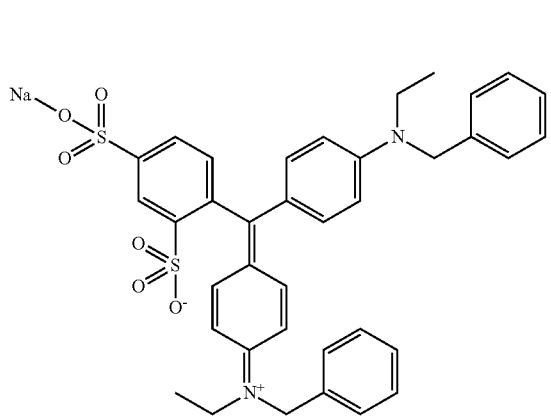

(commercially available as Acid Blue 7); and a phthalocyanine with a chemical structure of:

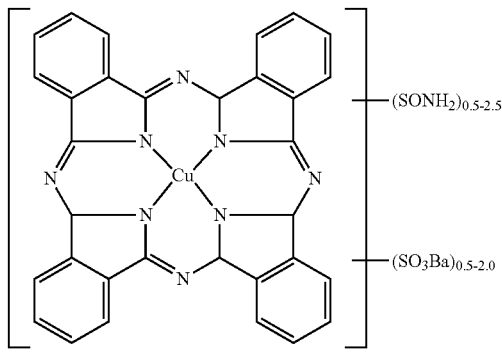

(commercially available as Direct Blue 199); and combinations thereof.

An example of the pigment based coloring agent may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents include C9384A (printhead HP 72), C9383A (printhead HP 72), C4901A (printhead HP 940), and C4900A (printhead HP 940).

Detailing Agents

In the examples of the 3D printing kit, the 3D printing methods, and the 3D printing system disclosed herein a detailing agent may be used. The detailing agent may include a surfactant, a co-solvent, and a balance of water. In some examples, the detailing agent consists of these components, and no other components. In some other examples, the detailing agent may further include additional components, such as humectant(s), anti-kogation agent(s), antimicrobial agent(s), and/or chelating agent(s) (each of which is described above in reference to the fusing agent).

The surfactant(s) that may be used in the detailing agent include any of the surfactants listed above in reference to the fusing agent. The total amount of surfactant(s) in the detailing agent may range from about 0.10 wt % to about 5.00 wt % with respect to the total weight of the detailing agent.

The co-solvent(s) that may be used in the detailing agent include any of the co-solvents listed above in reference to the fusing agent. The total amount of co-solvent(s) in the detailing agent may range from about 1.00 wt % to about 20.00 wt % with respect to the total weight of the detailing agent.

Similar to the fusing agent, the co-solvent(s) of the detailing agent may depend, in part upon the jetting technology that is to be used to dispense the detailing agent. For example, if thermal inkjet printheads are to be used, water and/or ethanol and/or other longer chain alcohols (e.g., pentanol) may make up 35 wt % or more of the detailing agent. For another example, if piezoelectric inkjet printheads are to be used, water may make up from about 25 wt % to about 30 wt % of the detailing agent, and 35 wt % or more of the detailing agent may be ethanol, isopropanol, acetone, etc.

The balance of the detailing agent is water. As such, the amount of water may vary depending upon the amounts of the other components that are included.

While the example detailing agent described herein does not include a colorant, it is to be understood that any of the colorants described for the coloring agent (i.e., transparent to infrared wavelengths) may be used in the detailing agent. As one example, it may be desirable to add color to the detailing agent when the detailing agent is applied to the edge of a colored part. Color in the detailing agent may be desirable when used at a part edge because some of the colorant may become embedded in the build material that fuses/coalesces at the edge.

Printing Methods

Figure 2:
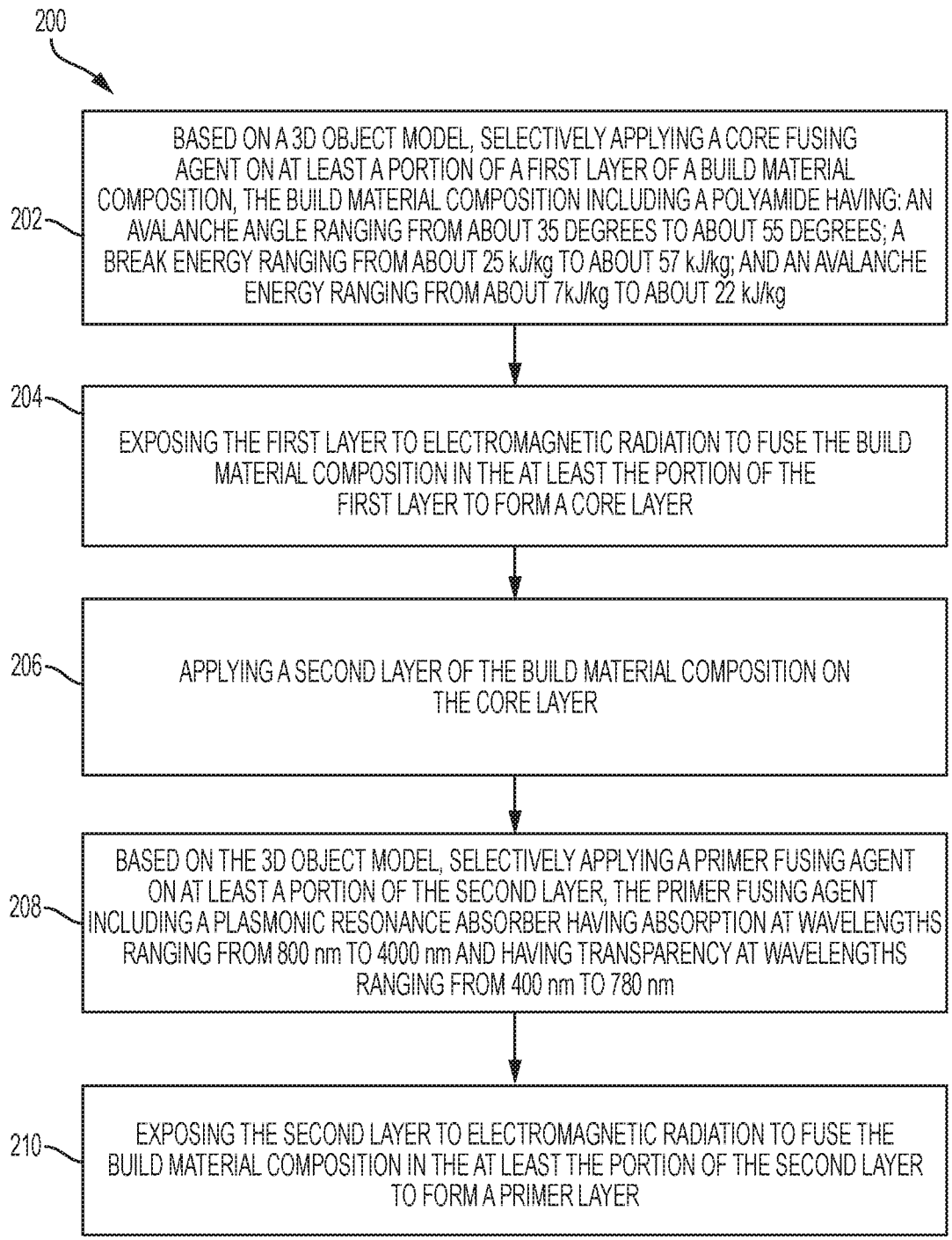
FIG. 2 is a flow diagram illustrating another example of a method for 3D printing.

Referring now to FIGS. 1 and 2, examples of methods 100, 200 for 3D printing are depicted. The examples of the methods 100, 200 may use examples of the 3D printing kit disclosed herein. Additionally, the examples of the methods 100, 200 may be used to print 3D objects that exhibit a white color, a cyan color, a magenta color, a yellow color, a black color, or a combination thereof.

As shown in FIG. 1, the method 100 for three-dimensional (3D) printing comprises: applying a build material composition to form a build material layer, the build material composition including a polyamide having: an avalanche angle ranging from about 35 degrees to about 55 degrees; a break energy ranging from about 25 kJ/kg to about 57 kJ/kg; and an avalanche energy ranging from about 7 kJ/kg to about 22 kJ/kg (reference numeral 102); based on a 3D object model, selectively applying a fusing agent on at least a portion of the build material layer (reference numeral 104); and exposing the build material layer to electromagnetic radiation to coalesce the build material composition in the at least the portion to form a layer of a 3D object (reference numeral 106).

In some examples, the method 100 further comprises: iteratively applying individual build material layers of the build material composition; based on the 3D object model, selectively applying the fusing agent to at least some of the individual build material layers to define individually patterned layers, wherein the fusing agent is selected from the group consisting of a core fusing agent, a primer fusing agent, or both the core fusing agent and the primer fusing agent; and iteratively exposing the individually patterned layers to the electromagnetic radiation to form individual object layers, wherein each of the individual object layers is selected from the group consisting of a core layer, a primer layer, or a layer including a core portion and a primer portion.

As shown in FIG. 2, the method 200 for three-dimensional (3D) printing comprises: based on a 3D object model, selectively applying a core fusing agent on at least a portion of a first layer of a build material composition, the build material composition including a polyamide having: an avalanche angle ranging from about 35 degrees to about 55 degrees; a break energy ranging from about 25 kJ/kg to about 57 kJ/kg; and an avalanche energy ranging from about 7 kJ/kg to about 22 kJ/kg (reference numeral 202); exposing the first layer to electromagnetic radiation to fuse the build material composition in the at least the portion of the first layer to form a core layer (reference numeral 204); applying a second layer of the build material composition on the core layer (reference numeral 206); based on the 3D object model, selectively applying a primer fusing agent on at least a portion of the second layer, the primer fusing agent including a plasmonic resonance absorber having absorption at wavelengths ranging from 800 nm to 4000 nm and having transparency at wavelengths ranging from 400 nm to 780 nm (reference numeral 208); and exposing the second layer to electromagnetic radiation to fuse the build material composition in the at least the portion of the second layer to form a primer layer (reference numeral 210).

In some examples, the method 200 further comprises: applying a third layer of the build material composition on the primer layer; based on the 3D object model, selectively applying a coloring agent and (i) the core fusing agent or (ii) the primer fusing agent on at least a portion of the third layer; and exposing the third layer to electromagnetic radiation to fuse the build material composition in the at least the portion of the third layer to form a colored layer having a colorant of the coloring agent embedded therein.

Figure 3:
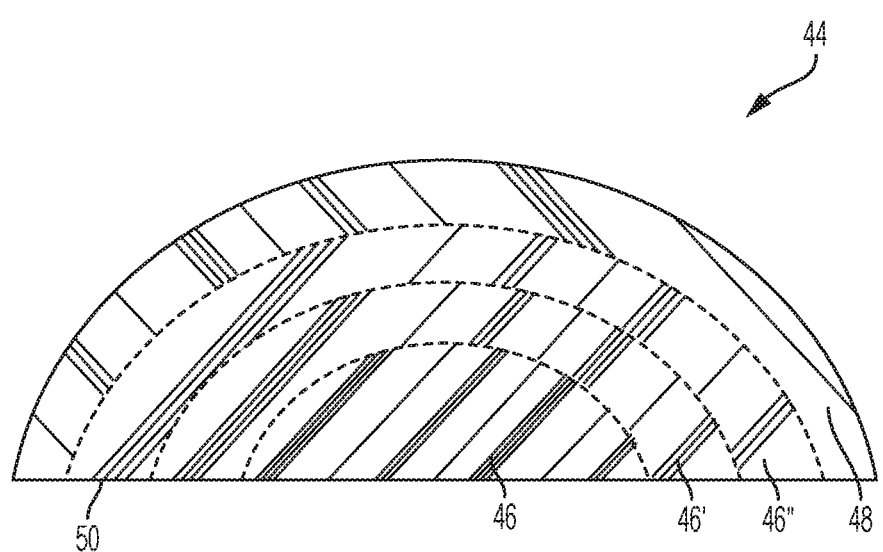
FIG. 3 is a cross-sectional view of an example of a part formed using an example of the 3D printing methods disclosed herein.

The methods 100, 200 may be used to form an object 44 as shown in FIG. 3, which includes several core layers 46, 46', 46" and an outer white layer 48 (also referred to herein as a primer layer). The core layers 46, 46', 46" are sequentially formed by selectively patterning respective build material layers with the core fusing agent 28 and exposing each patterned layer to electromagnetic radiation. The core layers 46, 46', 46" may be black or a dark color due to the absorber in the core fusing agent 28. The outer white layer 48 is formed by applying a build material layer on the outermost core layer 46", patterning it with the primer fusing agent 26, 26', and exposing it to electromagnetic radiation. Since the primer fusing agent 26, 26' has no or low tint, the white color of the polyamide is visible, and thus gives the outer white layer 48 its white appearance. The outer white layer 48 provides the object 44 with a white (or slightly tinted) exterior surface. As such, the outer white layer 48 optically isolates the black core layer(s) 46, 46', 46" that it covers.

In the example object 44 shown in FIG. 3, the outer white layer 48 does not completely surround the object 44, but rather may be formed on the outer surface(s) of the core layer 46" that will be visible. For example, in FIG. 3, the surface 50 of the object 44 may not be visible when the object 44 is in use, and thus it may not be desirable to form the outer white layer 48 on this surface 50.

It is to be understood that the methods 100, 200 may include additional processing to form the object 44 with an outer colored layer (not shown in FIG. 3) on at least a portion of the outer white layer 48, or to form another object 44' (shown in FIG. 4H) which has the core layer(s) 46 completely encapsulated by a primer layer (including primer layer portions 48', 48", 48'", which are referred to herein respectively as primer layers 48, 48', 48") and an outer colored layer (including colored layer portions 52, 52', 52", which are referred to herein as colored layers 52, 52', 52").

The method 300 to form the object 44' will now be discussed in reference to FIGS. 4A through 4H. It is to be understood that the method 300 may be an example of the method 100 and/or the method 200.

Prior to execution of any of the methods 100, 200, 300 disclosed herein or as part of the methods 100, 200, 300 a controller 36 (see, e.g., FIG. 7) may access data stored in a data store 34 (see, e.g., FIG. 7) pertaining to a 3D object 44' that is to be printed. For example, the controller 36 may determine the number of layers of the build material composition 16 that are to be formed, the locations at which the fusing agent(s) 26, 26', 28 from the applicator(s) 24A, 24B is/are to be deposited on each of the respective layers, etc.

In FIGS. 4A and 4B, a layer 54 of the build material composition 16 is applied on the build area platform 12. As mentioned above, the build material composition 16 includes at least the polyamide, and may additionally include the glass, the filler, the antioxidant, the whitener, the antistatic agent, the flow aid, or combinations thereof.

In the example shown in FIGS. 4A and 4B, a printing system (e.g., the printing system 10 shown in FIG. 7) may be used to apply the build material composition 16. The printing system 10 may include a build area platform 12, a build material supply 14 containing the build material composition 16, and a build material distributor 18.

The build area platform 12 receives the build material composition 16 from the build material supply 14. The build area platform 12 may be moved in the directions as denoted by the arrow 20 (see FIG. 7), e.g., along the z-axis, so that the build material composition 16 may be delivered to the build area platform 12 or to a previously formed layer. In an example, when the build material composition 16 is to be delivered, the build area platform 12 may be programmed to advance (e.g., downward) enough so that the build material distributor 18 can push the build material composition 16 onto the build area platform 12 to form a substantially uniform layer of the build material composition 16 thereon. The build area platform 12 may also be returned to its original position, for example, when a new part is to be built.

The build material supply 14 may be a container, bed, or other surface that is to position the build material composition 16 between the build material distributor 18 and the build area platform 12. In some examples, the methods 100, 200, 300 further include heating the build material composition 16 in the build material supply 14 to a supply temperature ranging from about 25° C. to about 150° C. In these examples, the supply temperature may depend, in part, on the build material composition 16 used and/or the 3D printer used. The heating of the build material composition 16 in the build material supply 14 may be accomplished by heating the build material supply 14 to the supply temperature.

The build material distributor 18 may be moved in the directions as denoted by the arrow 22 (see FIG. 7), e.g., along the y-axis, over the build material supply 14 and across the build area platform 12 to spread the layer 54 of the build material composition 16 over the build area platform 12. The build material distributor 18 may also be returned to a position adjacent to the build material supply 14 following the spreading of the build material composition 16. The build material distributor 18 may be a blade (e.g., a doctor blade), a roller, a combination of a roller and a blade, and/or any other device capable of spreading the build material composition 16 over the build area platform 12. For instance, the build material distributor 18 may be a counter-rotating roller. In some examples, the build material supply 14 or a portion of the build material supply 14 may translate along with the build material distributor 18 such that build material composition 16 is delivered continuously to the material distributor 18 rather than being supplied from a single location at the side of the printing system 10 as depicted in FIG. 4A.

In FIG. 4A, the build material supply 14 may supply the build material composition 16 into a position so that it is ready to be spread onto the build area platform 12. The build material distributor 18 may spread the supplied build material composition 16 onto the build area platform 12. The controller 34 may process "control build material supply" data, and in response, control the build material supply 14 to appropriately position the particles of the build material composition 16, and may process "control spreader" data, and in response, control the build material distributor 18 to spread the supplied build material composition 16 over the build area platform 12 to form the layer 54 of build material composition 16 thereon. As shown in FIG. 4B, one build material layer 54 has been formed.

The layer 54 of the build material composition 16 has a substantially uniform thickness across the build area platform 12. In an example, the build material layer 54 has a thickness ranging from about 50 µm to about 120 µm. In another example, the thickness of the build material layer 54 ranges from about 30 µm to about 300 µm. It is to be understood that thinner or thicker layers may also be used. For example, the thickness of the build material layer 54 may range from about 20 µm to about 500 µm. The layer thickness may be about 2× (i.e., 2 times) the average diameter of the build material composition particles at a minimum for finer part definition. In some examples, the layer thickness may be about 1.2× the average diameter of the build material composition particles.

To form the object 44 shown in FIG. 3, this layer 54 of build material composition 16 would be patterned with the core fusing agent 28 (i.e., the core fusing agent 28 would be selectively dispensed on the layer 54 according to a pattern of a cross-section for the core layer 46), and then exposed to electromagnetic radiation to form the core layer 46. As used herein, the cross-section of the layer of the part to be formed refers to the cross-section that is parallel to the contact surface of the build area platform 12. As an example, if the core layer 46 is to be shaped like a cube or cylinder, the core fusing agent 28 will be deposited in a square pattern or a circular pattern (from a top view), respectively, on at least a portion of the layer 54 of the build material composition 16.

In the example shown in FIG. 4B, the layer 54 of build material composition 16 is a sacrificial layer that is used to enhance the color of the first layer (e.g., colored layer 52) of the object 44' that is being formed. As shown in FIG. 4B, the coloring agent 30 is selectively applied to at least the portion 56 of the layer 54. As such, the particles of the build material composition 16 in this portion 56 of the layer 54 become colored. In this example, this sacrificial layer 54 is not coalesced/fused (as no primer fusing agent 26, 26' or core fusing agent 28 is applied thereon). Rather, some of the colored particle of the build material composition 16 in the sacrificial layer 54 may become embedded in coalesced/fused build material composition of the part layer (e.g., colored layer 52) that is formed thereon. In other words, some of the colored build material composition 16 in portion 56 may become embedded in the surface of the part layer that is formed adjacent thereto. The non-coalesced/non-fused, but embedded colored build material composition 16 may help to maintain saturation at the surface (of the ultimately formed colored layer 52) by providing a colored interface between the colored layer 52 and surrounding non-coalesced/non-fused build material composition 16.

It is to be understood that the selective application of the coloring agent 30 may be accomplished in a single printing pass or in multiple printing passes. In an example, selectively applying of the coloring agent 30 is accomplished in multiple printing passes. In another example, the selectively applying of the coloring agent 30 is accomplished in a number of printing passes ranging from 2 to 4. It may be desirable to apply the coloring agent 30 in multiple printing passes to increase the amount of the colorant that is applied to the build material composition 16, to avoid liquid splashing, to avoid displacement of the build material composition 16, etc.

It is also to be understood that when an agent (e.g., the primer fusing agent 26, 26', the core fusing agent 28, the coloring agent 30, the detailing agent 42, etc.) is to be selectively applied to the build material composition 16, the agent 26, 26', 28, 30, 42 may be dispensed from an applicator 24A, 24B, 24C. The applicator(s) 24A, 24B, 24C may each be a thermal inkjet printhead, a piezoelectric printhead, a continuous inkjet printhead, etc., and the selective application of the agent(s) 26, 26', 28, 30, 42 may be accomplished by thermal inkjet printing, piezo electric inkjet printing, continuous inkjet printing, etc. The controller 36 may process data, and in response, control the applicator(s) 24A, 24B, 24C (e.g., in the directions indicated by the arrow 32, see FIG. 7) to deposit the agent(s) 26, 26', 28, 30, 42 onto predetermined portion(s) of the build material composition 16. Throughout the method 300, a single applicator may be labeled with multiple reference numbers (24A, 24B and/or 24C), although it is to be understood that the applicators may be separate applicators or a single applicator with several individual cartridges for dispensing the respective agents 26, 26', 28, 30, 42.

While not shown in FIG. 4B, the detailing agent 42 may be selectively applied on the portion 56 with the coloring agent 30. The detailing agent 42 may be used to maintain the temperature of the build material composition 16 in contact therewith below the melting point of the polyamide of the build material composition 16. Since the sacrificial layer 54 is not to be coalesced/fused, the detailing agent 42 may be applied to this layer 54 with the coloring agent 30.

Additionally, while one sacrificial layer 54 is shown, it is to be understood that several sacrificial layers 54 may be sequentially formed in contact with one another.

The color of the coloring agent 30 that is applied to the portion(s) 56 of the sacrificial layer 54 will depend upon the desired color for the object 44' or at least the portion of the colored layer 52 formed adjacent thereto. As examples, a black agent, a cyan agent, a magenta agent, or a yellow agent may be applied alone or in combination to achieve a variety of colors.

The coloring agent 30 will penetrate at least partially into the sacrificial layer 54. Depending upon the particle size of the colorant in the coloring agent 30 and size of the voids between the particles of the build material composition 16, the coloring agent 30 may penetrate throughout the entire thickness of the sacrificial layer 54. This creates a surface upon which a subsequent layer 58 of build material composition 16 may be applied.

The layer 58 of the build material composition 16 may be applied in the same manner as the layer 54. The layer 58 is shown in FIG. 4C. The layer 58 may be considered to be the first build material layer because at least a portion of this layer 58 will be coalesced/fused to form the first layer of the 3D object 44' (since the sacrificial layer 54 is not coalesced/fused).

After the build material composition 16 has been applied, and prior to further processing, the build material layer 58 may be exposed to heating. Heating may be performed to pre-heat the build material composition 16, and thus the heating temperature may be below the melting point of the polyamide of the build material composition 16. As such, the temperature selected will depend upon the build material composition 16 that is used. As examples, the pre-heating temperature may be from about 5° C. to about 50° C. below the melting point of the polyamide. In an example, the pre-heating temperature ranges from about 50° C. to about 205° C. In another example, the pre-heating temperature ranges from about 100° C. to about 205° C. In yet another example, the pre-heating temperature ranges from about 100° C. to about 190° C. In still another example, the methods 100, 200, 300 further include, prior to the selectively applying of the fusing agent 26, 26', 28, pre-heating the build material composition 16 to a pre-heating temperature ranging from about 5° C. to about 50° C. below the melting point of the polyamide. The low pre-heating temperature may enable the non-patterned build material composition 16 to be easily removed from the 3D object 44' after completion of the 3D object 44'.

Pre-heating the layer 58 of the build material composition 16 may be accomplished by using any suitable heat source that exposes all of the build material composition 16 on in the layer 58 to the heat. Examples of the heat source include a thermal heat source (e.g., a heater (not shown)) integrated into the build area platform 12 (which may include sidewalls)) or the radiation source 38, 38' (see, e.g., FIG. 7).

After the layer 58 is formed, and in some instances is pre-heated, the primer fusing agent 26, 26' and the coloring agent 30 are selectively applied on the same portion(s) 60 of the build material composition 16 in the layer 58.

As mentioned above, the primer fusing agent 26, 26' includes an aqueous or non-aqueous vehicle and a plasmonic resonance absorber dispersed therein. The fusing agent 26' is one specific example of the low tint or primer fusing agent, which includes CTO nanoparticles as the plasmonic resonance absorber, a zwitterionic stabilizer, and an aqueous vehicle. Example compositions of the primer fusing agent 26, 26' are described above.

When the desired color for the object 44' or a particular colored layer 52 of the object 44' is the color of the coloring agent 30, the primer fusing agent 26, 26' is applied with the coloring agent 30. Since the primer fusing agent 26, 26' is clear or slightly tinted, the color of the coloring agent 30 will be the color of the resulting colored layer 52, as the colorants of the coloring agent 30 become embedded throughout the coalesced/fused build material composition of the colored layer 52. The primer fusing agent 26, 26' may be particularly suitable for obtaining lighter colors or white.

The primer fusing agent 26, 26' and the coloring agent 30 are selectively applied in a pattern of a cross-section for the colored layer 52 that is to be formed (shown in FIG. 4D). In the example shown in FIG. 4C, the portion 60 is adjacent to the portion 56 of the layer 54 to which the coloring agent 30 has been applied.

It is to be understood that the selective application of the primer fusing agent 26, 26' may be accomplished in a single printing pass or in multiple printing passes. In an example, selectively applying of the primer fusing agent 26, 26' is accomplished in multiple printing passes. In another example, the selectively applying of the primer fusing agent 26, 26' is accomplished in a number of printing passes ranging from 2 to 4. In still another example, selectively applying of the primer fusing agent 26, 26' is accomplished in 2 printing passes. In yet another example, selectively applying of the primer fusing agent 26, 26' is accomplished in 4 printing passes. It may be desirable to apply the primer fusing agent 26, 26' in multiple printing passes to increase the amount of the energy absorber that is applied to the build material composition 16, to avoid liquid splashing, to avoid displacement of the build material composition 16, etc.

The volume of the primer fusing agent 26, 26' that is applied per unit of the build material composition 16 in the patterned portion 60 may be sufficient to absorb and convert enough electromagnetic radiation so that the build material composition 16 in the patterned portion 60 will coalesce/fuse. The volume of the primer fusing agent 26, 26' that is applied per unit of the build material composition 16 may depend, at least in part, on the energy absorber used, the energy absorber loading in the primer fusing agent 26, 26', and the build material composition 16 used.

After the primer fusing agent 26, 26' and the coloring agent 30 are selectively applied in the specific portion(s) 60 of the layer 58, the entire layer 58 of the build material composition 16 is exposed to electromagnetic radiation (shown as EMR Exposure between FIGS. 4C and 4D).

The electromagnetic radiation is emitted from the radiation source 38, 38'. The length of time the electromagnetic radiation is applied for, or energy exposure time, may be dependent, for example, on one or more of: characteristics of the radiation source 38, 38'; characteristics of the build material composition 16; and/or characteristics of the primer fusing agent 26, 26'.

It is to be understood that the exposing of the build material composition 16 to electromagnetic radiation may be accomplished in a single radiation event or in multiple radiation events. In an example, the exposing of the build material composition 16 is accomplished in multiple radiation events. In another example, the exposing of the build material composition 16 to electromagnetic radiation may be accomplished in a number of radiation events ranging from 3 to 8. In still another example, the exposing of the build material composition 16 to electromagnetic radiation may be accomplished in 3 radiation events. It may be desirable to expose the build material composition 16 to electromagnetic radiation in multiple radiation events to counteract a cooling effect that may be brought on by the amount of the primer fusing agent 26, 26' that is applied to the build material layer 58. Additionally, it may be desirable to expose the build material composition 16 to electromagnetic radiation in multiple radiation events to sufficiently elevate the temperature of the build material composition 16 in the portion(s) 60, without over heating the build material composition 16 in the non-patterned portion(s).

The primer fusing agent 26, 26' enhances the absorption of the radiation, converts the absorbed radiation to thermal energy, and promotes the transfer of the thermal heat to the build material composition 16 in contact therewith. In an example, the primer fusing agent 26, 26' sufficiently elevates the temperature of the build material composition 16 in the layer 58 to a temperature above the melting point of the polyamide of the build material composition 16, allowing coalescing/fusing (e.g., thermal merging, melting, binding, etc.) of the build material composition 16 to take place. The application of the electromagnetic radiation forms the colored layer 52, shown in FIG. 4D.

In some examples of the methods 100, 200, 300, the electromagnetic radiation has a wavelength ranging from 800 nm to 4000 nm. In another example the electromagnetic radiation has a wavelength ranging from 800 nm to 1400 nm. In still another example, the electromagnetic radiation has a wavelength ranging from 800 nm to 1200 nm. Radiation having wavelengths within the provided ranges may be absorbed (e.g., 80% or more of the applied radiation is absorbed) by the primer fusing agent 26, 26' and may heat the build material composition 16 in contact therewith, and may not be substantially absorbed (e.g., 25% or less of the applied radiation is absorbed) by the non-patterned build material composition 16.

It is to be understood that portions of the build material composition 16 that do not have the primer fusing agent 26, 26' applied thereto do not absorb enough radiation to coalesce/fuse. As such, these portions do not become part of the 3D object 44' that is ultimately formed. However, the generated thermal energy may propagate into the surrounding build material composition 16 that does not have primer fusing agent 26, 26' applied thereto. The propagation of thermal energy may be inhibited from coalescing/fusing the non-patterned build material composition 16 in the layer 58, for example, when the detailing agent 42 is applied to the build material composition 16 in the layer 58 that are not exposed to the primer fusing agent 26, 26'. Moreover, the propagation of thermal energy may be inhibited from coalescing/fusing the build material composition 16 in the layer 54 when the detailing agent 42 is applied with the coloring agent 30 in the layer 54. However, as mentioned above, some of the colored build material composition 16 in the layer 54 may become embedded in the adjacent surface of the coalesced/fused build material composition of the colored layer 52.

While a single colored layer 52 is shown, it is to be understood that several colored layers 52 may be sequentially formed in contact with one another so that a color region (thicker than one voxel) is built up around the core layer(s) 46 in the final object 44'. The outermost colored layer 52 may form a one voxel deep shell, and the other colored layers may create the thicker color region. The levels of the primer fusing agent 26, 26' and the coloring agent 30 may be higher in the outermost colored layer 52, compared to other colored layers positioned closer to the core layer(s) 46, in order to increase color saturation at the exterior of the formed object 44'.

FIG. 4D also illustrates yet another layer 62 of the build material composition 16, this time the layer 62 being applied to the colored layer 52 and to any non-coalesced/non-fused build material composition 16 of layer 58. The layer 62 may be applied in the same manner as the layers 54, 58.

Prior to further processing, the layer 62 of the build material composition 16 may be exposed to pre-heating in the manner previously described.

After the layer 62 is formed, and in some instances is pre-heated, the primer fusing agent 26, 26' is selectively applied on portion(s) 64 of the build material composition 16 in the layer 62. The portion(s) 64 of the layer 62 will form the primer layer 48', which is white, clear, or slightly tinted from the primer fusing agent 26, 26'. This primer layer 48' is positioned between the colored layer 52 and subsequently formed black core layer(s) 46 in the object 44' (see FIG. 4H). This primer layer 48' may be referred to as the initial layer or the first primer layer. The primer layer 48' optically isolates at least a portion of the black core layer(s) 46.

Figure 4E:
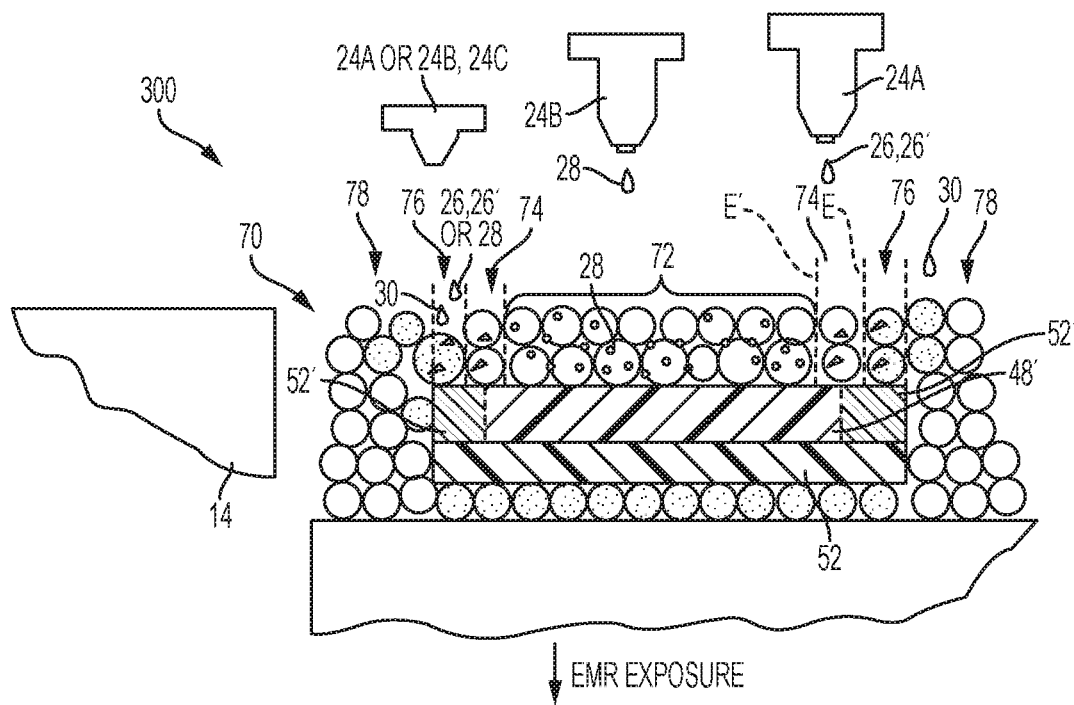

In the example shown in FIG. 4D, the portion 64 to which the primer fusing agent 26, 26' is selectively applied is adjacent to part (but not all) of the already formed colored layer 52. Selectively applying the primer fusing agent 26, 26' in this manner may be performed when it is desirable to form colored layer(s) 52' (shown in FIG. 4E) along the sides of the object 44' that is being formed. To form the colored layer(s) 52' along the sides of the object 44', the primer fusing agent 26, 26' and the coloring agent 30 are selectively applied on other portion(s) 66 of the build material composition 16 in the layer 62. As an example, the portion(s) 66 may define the perimeter of that particular layer of the object 44' that is being formed, and may be outside of a perimeter or an edge boundary E (i.e., the outermost portions where the primer fusing agent 26, 26' alone is selectively deposited in any build material layer) of the portion 64.

When it is desirable to form the colored layer 52' (shown in FIG. 4E) along the sides of the object 44' that is being formed, it may also be desirable to selectively deposit the coloring agent 30 (with or without the detailing agent 42) in portion(s) 68 of the non-patterned build material composition 16 which are adjacent to or surround the portion(s) 66 (which when coalesced/fused, will form the colored layer 52' along the sides of the object 44'). The colored build material composition 16 in the portion(s) 68 may become embedded in coalesced/fused build material composition of the colored layer 52'. This non-coalesced/non-fused, but embedded colored build material composition 16 may help to maintain saturation at the surface (of the colored layer 52') by providing a colored interface between the colored layer 52' and surrounding non-coalesced/non-fused build material composition 16.

After the primer fusing agent 26, 26' is applied on the portion(s) 64, and in some instances the primer fusing agent 26, 26' and the coloring agent 30 are selectively applied on the portion(s) 66, the entire layer 62 of the build material composition 16 is exposed to electromagnetic radiation (shown as EMR Exposure between FIGS. 4D and 4E) in the manner previously described. Exposure to electromagnetic radiation forms the primer layer 48', as shown in FIG. 4E.

If the primer fusing agent 26, 26' and the coloring agent 30 are selectively applied on the portion(s) 66, the EMR exposure will form colored layer(s) 52' at the outer edge(s). This exposure to electromagnetic radiation forms the colored layer(s) 52', as shown in FIG. 4E.

The width of the colored layer(s) 52' may be large enough to form the color region at this portion of the object 44'. The levels of the primer fusing agent 26, 26', and the coloring agent 30 may be higher at the outermost edge of the colored layer(s) 52', compared to the innermost edge(s) of the colored layer(s) 52', in order to increase color saturation at the exterior of the formed object 44'.

FIG. 4E also illustrates yet another layer 70 of the build material composition 16, this time the layer 70 being applied to the primer layer 48', the colored layer(s) 52', and to any non-coalesced/non-fused build material composition 16 of layer 62. The layer 70 may be applied in the same manner as the layers 54, 58, 62.

Prior to further processing, the layer 70 of the build material composition 16 may be exposed to pre-heating in the manner previously described.

After the layer 70 is formed, and in some instances is pre-heated, the core fusing agent 28 is selectively applied on portion(s) 72 of the build material composition 16 in the layer 70. In one example, the method 200 includes: based on a 3D object model, selectively applying a core fusing agent 28 on at least a portion 72 of a (first) layer 70 of a build material composition 16, the build material composition 16 including a polyamide having: an avalanche angle ranging from about 35 degrees to about 55 degrees; a break energy ranging from about 25 kJ/kg to about 57 kJ/kg; and an avalanche energy ranging from about 7 kJ/kg to about 22 kJ/kg.

As mentioned above, the core fusing agent 28 includes at least an aqueous or non-aqueous vehicle and an active material dispersed or dissolved therein.

It is to be understood that the selective application of the core fusing agent 28 may be accomplished in a single printing pass or in multiple printing passes. In an example, selectively applying of the core fusing agent 28 is accomplished in multiple printing passes. In another example, the selectively applying of the core fusing agent 28 is accomplished in a number of printing passes ranging from 2 to 4. In still another example, selectively applying of the core fusing agent 28 is accomplished in 2 printing passes. In yet another example, selectively applying of the core fusing agent 28 is accomplished in 4 printing passes. It may be desirable to apply the core fusing agent 28 in multiple printing passes to increase the amount of the energy absorber that is applied to the build material composition 16, to avoid liquid splashing, to avoid displacement of the build material composition 16, etc.

The volume of the core fusing agent 28 that is applied per unit of the build material composition 16 in the patterned portion 72 may be sufficient to absorb and convert enough electromagnetic radiation so that the build material composition 16 in the patterned portion 72 will coalesce/fuse. The volume of the core fusing agent 28 that is applied per unit of the build material composition 16 may depend, at least in part, on the energy absorber used, the energy absorber loading in the core fusing agent 28, and the build material composition 16 used.

The portion(s) 72 of the layer 70 will form the core layer 46 (FIG. 4F), which may be black from the core fusing agent 28. While a single core layer 46 is shown, it is to be understood that several core layers 46 may be sequentially formed in contact with one another so that a core region (or part core) is built up, which makes up the bulk of the object 44'. Several core layers 46 may enhance the mechanical properties of the object 44'.

In the example shown in FIG. 4E, the portion 72 to which the core fusing agent 28 is selectively applied is adjacent to part (but not all) of the already formed primer layer 48'. Selectively applying the core fusing agent 28 in this manner may be performed when it is desirable to form colored layer(s) 52' (shown in FIG. 4F) along the sides of the object 44' that is being formed. Since the core layer 46 being formed may be black, it may also be desirable to form the primer layer 48" between the core layer 46 and the adjacent colored layer(s) 52'.

To form the primer layer 48" along the perimeter of the core layer 46, the primer fusing agent 26, 26' is selectively applied on other (or second) portion(s) 74 of the build material composition 16 in the layer 70 that are immediately adjacent to the perimeter or edge boundary E' (i.e., the outermost portions where the core fusing agent 28 alone is selectively deposited in any build material layer) of the portion 72. The perimeter/edge boundary E' is thus defined by the core fusing agent 28. To form the colored layer(s) 52' along/adjacent to the perimeter of the primer layer 48", the primer fusing agent 26, 26' and the coloring agent 30 are selectively applied on still other (or third) portion(s) 76 of the build material composition 16 in the layer 70 that are immediately adjacent to the perimeter or edge boundary E of the portion 74 (which is defined by the primer fusing agent 26, 26').

When it is desirable to form the colored layer(s) 52' (shown in FIG. 4F) along the sides of the object 44' that is being formed, it may also be desirable to selectively deposit the coloring agent 30 (with or without the detailing agent 42) in portion(s) 78 of the non-patterned build material composition 16 which are adjacent to or surround the portion(s) 76 (which when coalesced/fused, will form the colored layer 52' along the sides of the object 44').

After the layer 70 is patterned in a desirable manner with at least the core fusing agent 28, the entire layer 70 of the build material composition 16 is exposed to electromagnetic radiation (shown as EMR Exposure between FIGS. 4E and 4F) in the manner previously described, except that the wavelength range may be expanded to as low as 400 nm because some of the energy absorbers in the core fusing agent 28 can absorb visible light as well as infrared light. In one example, the method 200 includes: exposing the (first) layer 70 to electromagnetic radiation to fuse the build material composition 16 in the at least the portion 72 of the (first) layer 70 to form a core layer 46.

The core fusing agent 28 enhances the absorption of the radiation in portion 72, converts the absorbed radiation to thermal energy, and promotes the transfer of the thermal heat to the build material composition 16 in contact therewith. In an example, the core fusing agent 28 sufficiently elevates the temperature of the build material composition 16 in portion 72 to a temperature above the melting point of the polyamide of the build material composition 16, allowing coalescing/fusing (e.g., thermal merging, melting, binding, etc.) of the build material composition 16 to take place. Exposure to electromagnetic radiation forms the core layer 46, as shown in FIG. 4F.

Figure 4F:
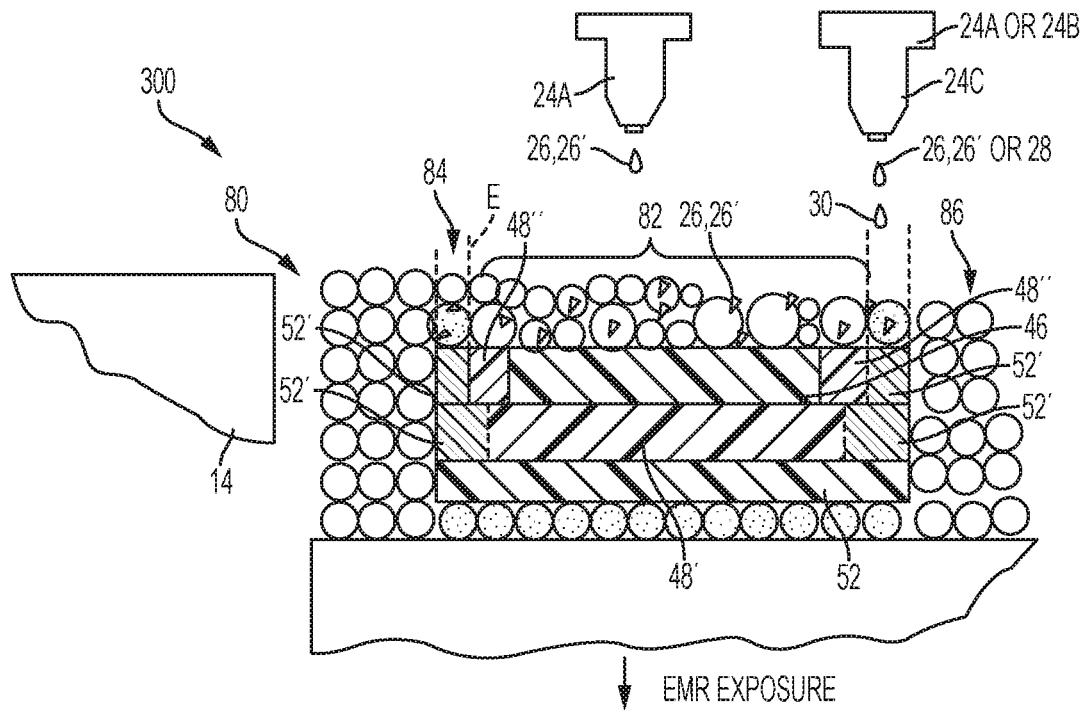

If the primer fusing agent 26, 26' is selectively applied on the portion(s) 74, and the primer fusing agent 26, 26' and the coloring agent 30 are selectively applied on the portion(s) 76, the EMR exposure will also form primer layer(s) 48" and colored layer(s) 52' at the outer edge(s) of the core layer 46, as shown in FIG. 4F.

The width of the primer layer(s) 48" may be large enough to optically isolate the black core layer 46.

FIG. 4F also illustrates yet another layer 80 of the build material composition 16, this time the layer 80 being applied to the core layer 46, the primer layer(s) 48", the colored layer(s) 52', and to any non-coalesced/non-fused build material composition 16 of layer 70. The layer 80 may be applied in the same manner as the layers 54, 58, 62, 70. In one example, the method 200 includes: applying a second layer 80 of the build material composition 16 on the core layer 46.

Prior to further processing, the layer 80 of the build material composition 16 may be exposed to pre-heating in the manner previously described.

After the layer 80 is formed, and in some instances is pre-heated, the primer fusing agent 26, 26' is selectively applied on portion(s) 82 of the build material composition 16 in the layer 80. In one example, the method 200 includes: based on the 3D object model, selectively applying a primer fusing agent 26, 26' on at least a portion 82 of the second layer 80, the primer fusing agent 26, 26' including a plasmonic resonance absorber having absorption at wavelengths ranging from 800 nm to 4000 nm and having transparency at wavelengths ranging from 400 nm to 780 nm.

The portion(s) 82 of the layer 80 will form another primer layer 48''', which is white or slightly tinted from the primer fusing agent 26, 26'. This primer layer 48''' is positioned between the black core layer(s) 46 and subsequently formed colored layer(s) 52" in the object 44' (see FIG. 4H). As such, the primer layer 48''' optically isolates the black core layer(s) 46 at another end of the formed object 44'.

In the example shown in FIG. 4F, the portion 82 to which the primer fusing agent 26, 26' is selectively applied is adjacent to the already formed core layer(s) 46 and primer layer(s) 48". Selectively applying the primer fusing agent 26, 26' in this manner may be performed when it is desirable to form colored layer(s) 52' (shown in FIG. 4G) along the sides of the object 44' that is being formed. To form the colored layer(s) 52' along the sides of the object 44', the primer fusing agent 26, 26' and the coloring agent 30 are selectively applied on portion(s) 84 of the build material composition 16 in the layer 82. As an example, the portion(s) 84 may define the perimeter of that particular layer of the object 44' that is being formed, and may be outside of an edge boundary E of the portion 82.

When it is desirable to form the colored layer 52' (shown in FIG. 4G) along the sides of the object 44' that is being formed, it may also be desirable to selectively deposit the coloring agent 30 (with or without the detailing agent 42) in portion(s) 86 of the non-patterned build material composition 16 which are adjacent to or surround the portion(s) 84 (which when coalesced/fused, will form the colored layer 52' along the sides of the object 44').

Figure 4G:
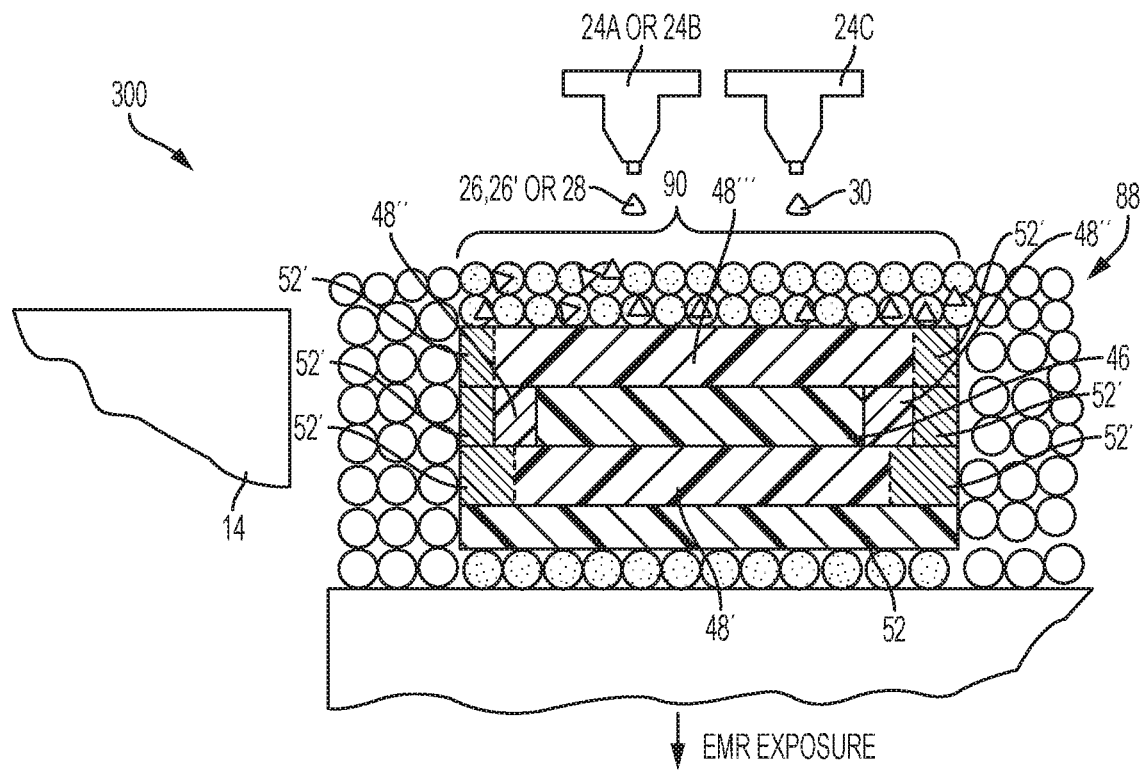

After the primer fusing agent 26, 26' is applied on the portion(s) 82, and in some instances the primer fusing agent 26, 26' and the coloring agent 30, are selectively applied on the portion(s) 84, the entire layer 80 of the build material composition 16 is exposed to electromagnetic radiation (shown as EMR Exposure between FIGS. 4F and 4G) in the manner previously described. Exposure to electromagnetic radiation forms the primer layer 48''', as shown in FIG. 4G. In one example, the method 200 includes: exposing the second layer 80 to electromagnetic radiation to fuse the build material composition 16 in the at least the portion 82 of the second layer 80 to form a primer layer 48'''.

If the primer fusing agent 26, 26' and the coloring agent 30 are selectively applied on the portion(s) 84, the EMR exposure will form colored layer(s) 52' at the outer edge(s) of the primer layer 48'''. This exposure to electromagnetic radiation forms the colored layer(s) 52', as shown in FIG. 4G.

FIG. 4G also illustrates yet another layer 88 of the build material composition 16, this time the layer 88 being applied to the primer layer(s) 48''' and the colored layer(s) 52' adjacent thereto, and to any non-coalesced/non-fused build material composition 16 of layer 80. The layer 88 may be applied in the same manner as the layers 54, 58, 62, 70, 80. In one example, the method 200 includes: applying a third layer 88 of the build material composition 16 on the primer layer 48'''.

Prior to further processing, the layer 88 of the build material composition 16 may be exposed to pre-heating in the manner previously described.

After the layer 88 is formed, and in some instances is pre-heated, the primer fusing agent 26, 26' and the coloring agent 30 are selectively applied on the same portion(s) 90 of the build material composition 16 in the layer 88. In one example, the method 200 includes: based on the 3D object model, selectively applying a coloring agent 30 and (i) the core fusing agent 28 or (ii) the primer fusing agent 26, 26' on at least a portion 90 of the third layer 88.

Figure 4H:
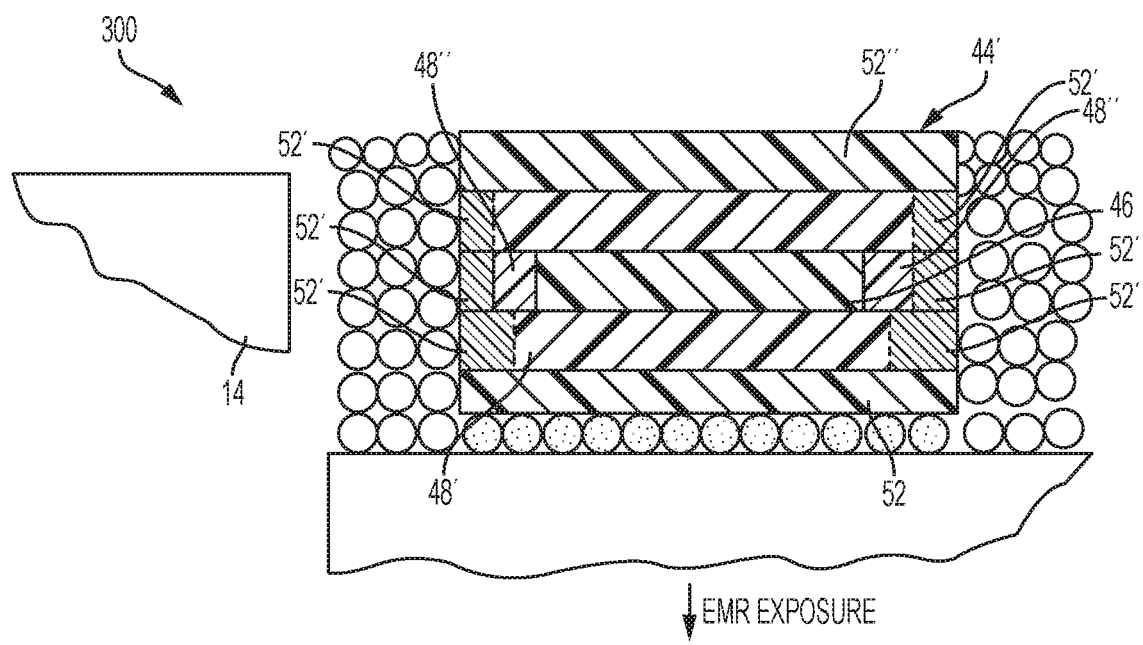

The primer fusing agent 26, 26' and the coloring agent 30 are selectively applied in a pattern of a cross-section for the colored layer 52" that is to be formed (shown in FIG. 4H). In the example shown in FIG. 4G, the portion 90 is adjacent to the primer layer 48''' and the colored layer(s) 52' is adjacent to the primer layer 48'''.

When the desired color for the object 44' or a particular colored layer 52" of the object 44' is the color of the coloring agent 30, the primer fusing agent 26, 26' is applied with the coloring agent 30. Since the primer fusing agent 26, 26' is clear or slightly tinted and the build material composition 16 is white, the color of the coloring agent 30 will be the color of the resulting colored layer 52", as the colorants of the coloring agent 30 become embedded throughout the coalesced/fused build material composition of the colored layer 52". The primer fusing agent 26, 26' may be particularly suitable for obtaining lighter colors or white.

It may also be desirable to selectively deposit the coloring agent 30 (with or without the detailing agent 42) in portion(s) of the non-patterned build material composition 16 which are adjacent to or surround the portion(s) 90 (which when coalesced/fused, will form the colored layer 52" along the top surface of object 44'). The colored build material composition 16 in the non-patterned portion(s) may become embedded in coalesced/fused build material composition along the sides or edges of the colored layer 52". The non-coalesced/non-fused, but embedded colored build material composition 16 may help to maintain saturation at the surface (of the colored layer 52") by providing a colored interface between the colored layer 52" and surrounding non-coalesced/non-fused build material composition 16.

After the primer fusing agent 26, 26' and the coloring agent 30 are selectively applied in the specific portion(s) 90 of the layer 88, the entire layer 88 of the build material composition 16 is exposed to electromagnetic radiation (shown as EMR Exposure between FIGS. 4G and 4H). In one example, the method 200 includes: exposing the third layer 88 to electromagnetic radiation to fuse the build material composition 16 in the at least the portion 90 of the third layer 88 to form a colored layer 52" having a colorant of the coloring agent 30 embedded therein.

The electromagnetic radiation is emitted from the radiation source 38, 38' in the manner previously described, with wavelengths suitable for the primer fusing agent 26, 26'. Exposure to electromagnetic radiation forms the colored layer 52", as shown in FIG. 4H, having colorants of the coloring agent 30 embedded therein.

While a single colored layer 52" is shown, it is to be understood that several colored layers 52" may be sequentially formed in contact with one another so that a color region (thicker than one voxel) is built up around the core layer(s) 46 in the final object 44'. The outermost colored layer 52" may form a one voxel deep shell, and the other colored layers may create the thicker color region. The levels of the primer fusing agent 26, 26' and the coloring agent 30 may be higher in the outermost colored layer 52", compared to other colored layers positioned closer to the core layer(s) 46, in order to increase color saturation at the exterior of the formed object 44'.

While not shown, the coloring agent 30 may be selectively applied to the colored layer 52". In one example, the method 200 further comprises applying the coloring agent 30 on the colored layer 52".

The coloring agent 30 applied to the colored layer 52" may help to maintain saturation at the surface of the colored layer 52" by coloring the build material composition particles at the surface, whether these particles are coalesced/fused, or non-coalesced/non-fused and embedded in the coalesced/fused particles.

Also while not shown, it is to be understood that the detailing agent 42 may be selectively applied on the colored layer 52" with the coloring agent 30. In one example, the method 200 further comprises applying a detailing agent 42 with the coloring agent 30.

Throughout the methods 100, 200, 300, the color of the coloring agent 30 that is applied will depend upon the desired color for the object 44' or at least the portion of the colored layer(s) 52, 52', 52" to be formed. As examples, a black agent, a cyan agent, a magenta agent, or a yellow agent may be applied alone or in combination to achieve a variety of colors.

It to be understood that the methods 100, 200, 300 may be modified so that the core fusing agent 28, rather than the primer fusing agent 26, 26', is applied with the coloring agent 30 to form the colored layers 52, 52', 52". The primer fusing agent 26, 26' may be particularly suitable for obtaining lighter colors or white. When the desired color for colored layer 52 is a darker color or black, the core fusing agent 28 may be applied with the coloring agent 30.

It to be further understood that the methods 100, 200, 300 may be modified so that the sacrificial layer 54 (with the coloring agent 30 thereon) and the outer colored layers 52, 52', 52" are not formed. In this modified form of the methods 100, 200, 300, the primer layer 48' would be formed first. In the resulting part, all of the primer layers 48', 48'", 48'" would be exposed/visible, and thus would form the exterior of the part. In this example, the primer layers 48', 48'", 48'" would form an outer white layer which encapsulates the core layer(s) 46. When the methods 100, 200, 300 are modified in this manner, the part that is formed is white or slightly tinted (depending upon the color of the primer fusing agent 26, 26').

The method 400 to form the object 44" will now be discussed in reference to FIGS. 5A through 5C. It is to be understood that the method 400 may be another example of the method 100.

In FIG. 5A, a layer 94 of the build material composition 16 is applied on the build area platform 12. The layer 94 may be applied in the same manner as described above.

The layer 94 of the build material composition 16 may be exposed to pre-heating in the manner described herein.

After the layer 94 is applied, and in some instances is pre-heated, the primer fusing agent 26, 26' is selectively applied on portion(s) 96 of the build material composition 16 in the layer 94. While the primer fusing agent 26' is shown in FIGS. 5A and 5C, it is to be understood that the primer fusing agent 26 may be used instead of the primer fusing agent 26'.

The portion(s) 96 of the layer 94 will form the first layer 98 of the 3D object 44" (FIG. 5C) being formed. As such, the primer fusing agent 26, 26' is selectively dispensed on the layer 94 according to a pattern of a cross-section for the layer 98.

After the primer fusing agent 26, 26' is applied on the portion(s) 96, the entire layer 94 of the build material composition 16 is exposed to electromagnetic radiation (shown as EMR Exposure between FIGS. 5A and 5B) in the manner previously described.

In this example, the primer fusing agent 26, 26' sufficiently elevates the temperature of the build material composition 16 in portion 96 to a temperature above the melting point of the polyamide of the build material composition 16, allowing coalescing/fusing (e.g., thermal merging, melting, binding, etc.) of the build material composition 16 to take place. Exposure to electromagnetic radiation forms the layer 98, as shown in FIG. 5B.

It is to be understood that portions of the build material composition 16 that do not have the primer fusing agent 26, 26' applied thereto do not absorb enough energy to coalesce/fuse.

Figure 5C:
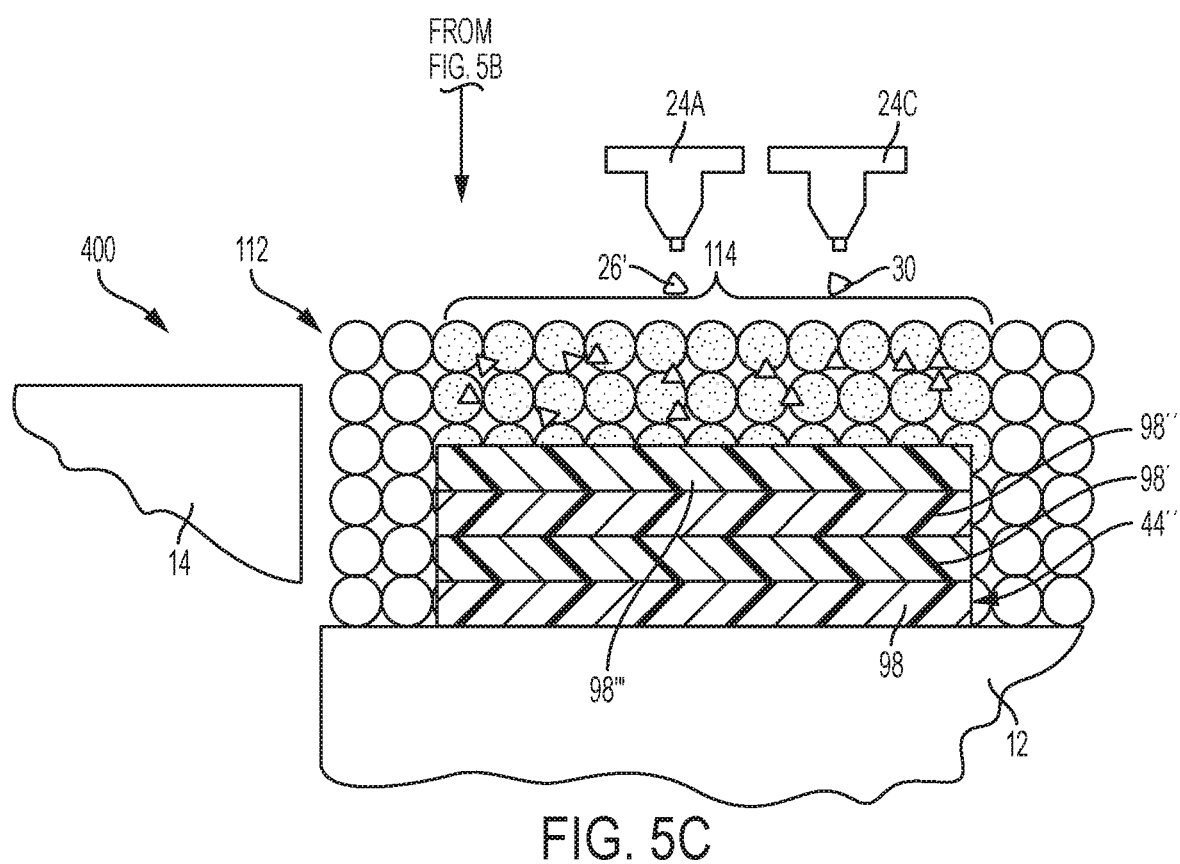

After the layer 98 is formed, additional layer(s) (e.g., 98', 98", 98'" shown in FIG. 5C) may be formed thereon to create an example of the 3D object 44" (shown in FIG. 5C). For example, to form the other layer 98', additional build material composition 16 may be applied on the layer 98. The primer fusing agent 26, 26' is then selectively applied on at least a portion of the additional build material composition 16, according to a pattern of a cross-section for the layer (e.g., 98') which is being formed. After the primer fusing agent 26, 26' is applied, the entire layer of the additional build material composition 16 is exposed to electromagnetic radiation in the manner previously described. The application of additional build material composition 16, the selective application of the primer fusing agent 26, 26', and the electromagnetic radiation exposure may be repeated a predetermined number of cycles to form the object 44".

In the example shown in FIGS. 5A through 5C, color may be imparted to the entire object 44" by applying the coloring agent 30 with the primer fusing agent 26, 26' in each of the portions of the respective build material layers that form layers 98, 98', 98", 98'".

The methods 100, 400 may end at the formation of object 44" or color may be imparted to the top surface of the object 44". This is shown in FIG. 5C.

To impart color, a final layer 112 of the build material composition 16 is applied to the object 44". As shown in FIG. 5C, this layer 112 is applied to the outermost layer 98'" of the object 44". Prior to further processing, the layer 112 may be exposed to pre-heating in the manner previously described.

After the layer 112 is formed, and in some instances is pre-heated, the primer fusing agent 26, 26' and the coloring agent 30 are selectively applied on the same portion(s) 114 of the build material composition 16 in the layer 112. The primer fusing agent 26, 26' and the coloring agent 30 are selectively applied in a pattern of a cross-section for the colored layer that is to be formed (not shown). The color of the coloring agent 30 that is applied will depend upon the desired color for the part.

After the primer fusing agent 26, 26' and the coloring agent 30 are applied, the entire layer 112 of the build material composition 16 is exposed to electromagnetic radiation in the manner previously described. The primer fusing agent 26, 26' sufficiently elevates the temperature of the build material composition 16 in the portion 114 of the layer 112 to a temperature above the melting point of the polyamide of the build material composition 16, allowing coalescing/fusing (e.g., thermal merging, melting, binding, etc.) of the build material composition 16 (in contact with the primer fusing agent 26, 26') to take place. Exposure to electromagnetic radiation forms the colored layer (not shown), having colorants of the coloring agent 30 embedded therein.

It is to be understood that several colored layers may be sequentially formed in contact with one another so that a color region (thicker than one voxel) is built up on the layers 98, 98', 98", 98'" in the final part. The outermost colored layer may form a one voxel deep shell, and the other colored layers may create the thicker color region. The levels of the primer fusing agent 26, 26' and the coloring agent 30 may be higher in the outermost colored layer, as compared to other colored layers positioned closer to the layer 98'", in order to increase color saturation at the exterior of the formed object 44'".

While not shown, the coloring agent 30 may be selectively applied to the colored layer. The coloring agent 30 applied to the colored layer may help to maintain saturation at the surface of the colored layer by coloring the build material composition particles at the surface, whether these particles are coalesced/fused or non-coalesced/non-fused and embedded in the coalesced/fused particles.

It is to be understood that the methods 100, 400 may also be modified similarly to the method 300 in order to form colored layers (e.g., 52 and 52') so that the part is completely encapsulated by colored layers.

Another example method 500 to form a 3D object will now be discussed in reference to FIGS. 6A and 6B. It is to be understood that the method 500 may be another example of the method 100.

In FIG. 6A, a layer 95 of the build material composition 16 is applied on the build area platform 12. The layer 95 may be applied in the same manner as described above.

The layer 95 of the build material composition 16 may be exposed to pre-heating in the manner described herein.

After the layer 95 is applied, and in some instances is pre-heated, the core fusing agent 28 is selectively applied on portion(s) 97 of the build material composition 16 in the layer 95. The portion(s) 97 of the layer 95 will form the first layer 99 of the 3D object being formed (not shown). As such, the core fusing agent 28 is selectively dispensed on the layer 95 according to a pattern of a cross-section for the layer 99.

After the core fusing agent 28 is applied on the portion(s) 97, the entire layer 95 of the build material composition 16 is exposed to electromagnetic radiation (shown as EMR Exposure between FIGS. 6A and 6B) in the manner previously described.

In this example, the core fusing agent 28 sufficiently elevates the temperature of the build material composition 16 in portion 97 to a temperature above the melting point of the polyamide of the build material composition 16, allowing coalescing/fusing (e.g., thermal merging, melting, binding, etc.) of the build material composition 16 to take place. Exposure to electromagnetic radiation forms the layer 99, as shown in FIG. 5B.

It is to be understood that portions of the build material composition 16 that do not have the core fusing agent 28 applied thereto do not absorb enough energy to coalesce/fuse.

After the layer 99 is formed, additional layer(s) may be formed thereon to create an example of the 3D object. For example, to form another layer, additional build material composition 16 may be applied on the layer 99. The core fusing agent 28 is then selectively applied on at least a portion of the additional build material composition 16, according to a pattern of a cross-section for the layer which is being formed. After the core fusing agent 28 is applied, the entire layer of the additional build material composition 16 is exposed to electromagnetic radiation in the manner previously described. The application of additional build material composition 16, the selective application of the core fusing agent 28, and the electromagnetic radiation exposure may be repeated a predetermined number of cycles to form the part.

In the example shown in FIGS. 6A and 6B, color may be imparted to the entire object 44″ by applying the coloring agent 30 with the core fusing agent 28 in each of the portions of the respective build material layers that form layers of the part.

It is to be understood that the methods 100, 500 may also be modified similarly to the method 300 in order to form colored layers (e.g., 52, 52′, 52″) so that the part is completely encapsulated by colored layers.

In any of the examples disclosed herein, when the 3D object 44, 44′, 44″ is complete, it may be removed from the build material platform 12, and any non-coalesced/non-fused build material composition 16 may be removed from the 3D object 44, 44′, 44″.

In any of the methods 100, 200, 300, 400, 500 disclosed herein, the non-patterned and non-coalesced/non-fused build material composition 16 may be reclaimed to be reused as build material in the printing of another 3D object. In some examples, the methods 100, 200, 300,400, 500 may be accomplished in an air environment. As used herein, an "air environment" or an "environment containing air" refers to an environment that contains 20 vol % or more of oxygen.

Printing System

Figure 7:
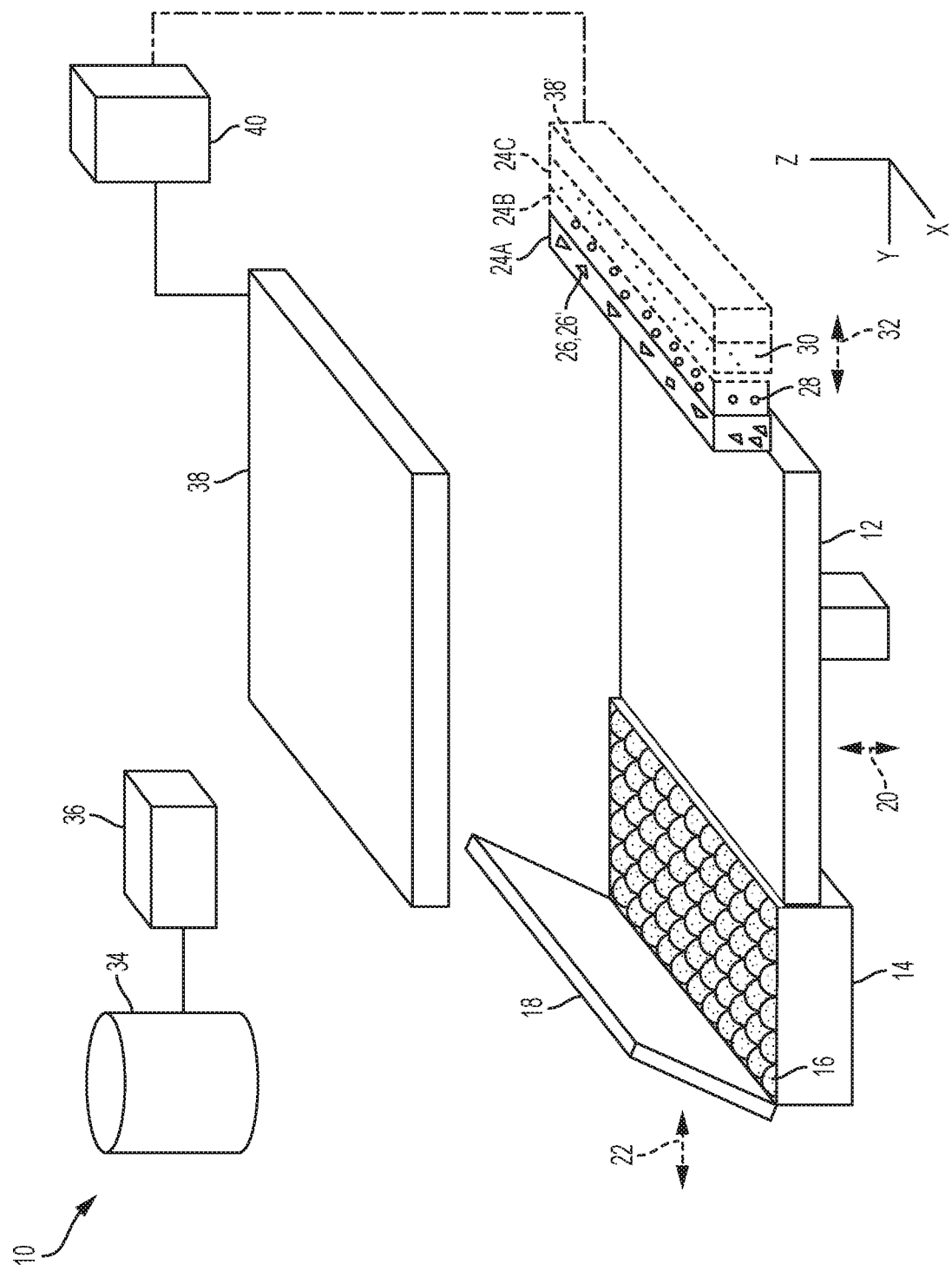
FIG. 7 is a simplified isometric and schematic view of an example of a 3D printing system disclosed herein.

Referring now to FIG. 7, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 7 may not be drawn to scale and thus, the 3D printing system 10 may have a different size and/or configuration other than as shown therein.

In an example, the three-dimensional (3D) printing system 10, comprises: a supply 14 of a build material composition 16 including a polyamide having: an avalanche angle ranging from about 35 degrees to about 55 degrees; a break energy ranging from about 25 kJ/kg to about 57 kJ/kg; and an avalanche energy ranging from about 7 kJ/kg to about 22 kJ/kg; a build material distributor 18; a supply of a fusing agent 26, 26′, 28; a first applicator 24A, 24B for selectively dispensing the fusing agent 26, 26′, 28; a source 38, 38′ of electromagnetic radiation; a controller 36; and a non-transitory computer readable medium having stored thereon computer executable instructions to cause the controller 36 to: utilize the build material distributor 18 to dispense the build material composition 16; utilize the first applicator 24A, 24B to selectively dispense the fusing agent 26, 26′, 28 on at least a portion of the build material composition 16; and utilize the source 38, 38′ of electromagnetic radiation to expose the build material composition 16 to radiation to coalesce/fuse the at least the portion of the build material composition 16. Any example of the build material composition 16 may be used in the examples of the system 10.

In some examples, the 3D printing system 10 may further include a supply of another fusing agent 26, 26′, 28; and another applicator 24A, 24B for selectively dispensing the other fusing agent 26, 26′, 28. In these examples, the computer executable instructions may further cause the controller 36 to utilize the other applicator 24A, 24B to selectively dispense the other fusing agent 26, 26′, 28.

In some other examples, the 3D printing system 10 may further include a supply of a coloring agent 30; and another applicator 24C for selectively dispensing the coloring agent 30. In these examples, the computer executable instructions may further cause the controller 36 to utilize the other applicator 24C to selectively dispense the coloring agent 30.

While not shown in FIG. 7, in still some other examples, the 3D printing system 10 may further include a supply of a detailing agent 42; and another applicator for selectively dispensing the detailing agent 42. In these examples, the computer executable instructions may further cause the controller 36 to utilize the other applicator to selectively dispense the detailing agent 42.

As shown in FIG. 7, the printing system 10 includes the build area platform 12, the build material supply 14 containing the build material composition 16 including the polyamide disclosed herein, and the build material distributor 18.

As mentioned above, the build area platform 12 receives the build material composition 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the build material composition 16 between the build material distributor 18 and the build area platform 12. In some examples, the build material supply 14 may include a surface upon which the build material composition 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material composition 16 from a storage location to a position to be spread onto the build area platform 12 or onto a previously formed layer of the 3D object. Another example of the mechanism for moving the build material composition 16 is a pneumatic conveying system.

As also mentioned above, the build material distributor 18 may be a blade (e.g., a doctor blade), a roller, a combination of a roller and a blade, and/or any other device capable of spreading the build material composition 16 over the build area platform 12 (e.g., a counter-rotating roller).

As shown in FIG. 7, the printing system 10 may include the applicator 24A, which may contain the fusing agent 26, 26'. As also shown, the printing system 10 may further include the applicator 24B, which may contain the fusing agent 28, and/or the applicator 24C, which may contain the coloring agent 30. While not shown, the printing system 10 may further include another applicator (which may contain the detailing agent 42).

The applicator(s) 24A, 24B, 24C may be scanned across the build area platform 12 in the directions indicated by the arrow 32, e.g., along the y-axis. The applicator(s) 24A, 24B, 24C may be, for instance, a thermal inkjet printhead, a piezoelectric printhead, a continuous inkjet printhead, etc., and may extend a width of the build area platform 12. While the each applicator 24A, 24B, 24C is shown in FIG. 7 as a single applicator, it is to be understood that each applicator 24A, 24B, 24C may include multiple applicators that span the width of the build area platform 12. Additionally, the applicators 24A, 24B, 24C may be positioned in multiple printbars. The applicator(s) 24A, 24B, 24C may also be scanned along the x-axis, for instance, in configurations in which the applicator(s) 24A, 24B, 24C do/does not span the width of the build area platform 12 to enable the applicator(s) 24A, 24B, 24C to deposit the respective agents 26, 26', 28, 30, 42 over a large area of the build material composition 16. The applicator(s) 24A, 24B, 24C may thus be attached to a moving XY stage or a translational carriage (neither of which is shown) that moves the applicator(s) 24A, 24B, 24C adjacent to the build area platform 12 in order to deposit the respective agents 26, 26', 28, 30, 42 in predetermined areas of the build material layer(s) that has/have been formed on the build area platform 12 in accordance with the methods 100, 200, 300, 400, 500 disclosed herein. The applicator(s) 24A, 24B, 24C may include a plurality of nozzles (not shown) through which the respective agents 26, 26', 28, 30, 42 are to be ejected.

The applicator(s) 24A, 24B, 24C may deliver drops of the respective agents 26, 26' 28, 30, 42 at a resolution ranging from about 300 dots per inch (DPI) to about 1200 DPI. In other examples, the applicator(s) 24A, 24B, 24C may deliver drops of the respective agents 26, 26', 28, 30, 42 at a higher or lower resolution. The drop velocity may range from about 10 m/s to about 24 m/s and the firing frequency may range from about 1 kHz to about 48 kHz. In one example, the volume of each drop may be on the order of about 3 picoliters (pL) to about 18 pL, although it is contemplated that a higher or lower drop volume may be used. In some examples, the applicator(s) 24A, 24B, 24C is/are able to deliver variable drop volumes of the respective agents 26, 26', 28, 30, 42. One example of a suitable printhead has 600 DPI resolution and can deliver drop volumes ranging from about 6 pL to about 14 pL.

Each of the previously described physical elements may be operatively connected to a controller 36 of the printing system 10. The controller 36 may process print data that is based on a 3D object model of the 3D object/part to be generated. In response to data processing, the controller 36 may control the operations of the build area platform 12, the build material supply 14, the build material distributor 18, and the applicator(s) 24A, 24B, 24C. As an example, the controller 36 may control actuators (not shown) to control various operations of the 3D printing system 10 components. The controller 36 may be a computing device, a semiconductor-based microprocessor, a central processing unit (CPU), an application specific integrated circuit (ASIC), and/or another hardware device. Although not shown, the controller 36 may be connected to the 3D printing system 10 components via communication lines.

The controller 36 manipulates and transforms data, which may be represented as physical (electronic) quantities within the printer's registers and memories, in order to control the physical elements to create the 3D object. As such, the controller 36 is depicted as being in communication with a data store 34. The data store 34 may include data pertaining to a 3D object to be printed by the 3D printing system 10. The data for the selective delivery of the build material composition 16, the fusing agent 26, 26', 28, etc. may be derived from a model of the 3D object to be formed. For instance, the data may include the locations on each build material layer that the first applicator 24A, 24B is to deposit the fusing agent 26, 26', 28. In one example, the controller 36 may use the data to control the first applicator 24A, 24B to selectively apply the fusing agent 26, 26', 28. The data store 34 may also include machine readable instructions (stored on a non-transitory computer readable medium) that are to cause the controller 36 to control the amount of build material composition 16 that is supplied by the build material supply 14, the movement of the build area platform 12, the movement of the build material distributor 18, the movement of the applicator(s) 24A, 24B, 24C, etc.

As shown in FIG. 7, the printing system 10 may also include a source 38, 38' of electromagnetic radiation. In some examples, the source 38 of electromagnetic radiation may be in a fixed position with respect to the build material platform 12. The source 38 in the fixed position may be a conductive heater or a radiative heater that is part of the printing system 10. These types of heaters may be placed below the build area platform 12 (e.g., conductive heating from below the platform 12) or may be placed above the build area platform 12 (e.g., radiative heating of the build material layer surface). In other examples, the source 38' of electromagnetic radiation may be positioned to apply radiation to the build material composition 16 immediately after the fusing agent 26, 26', 28 has been applied thereto. In the example shown in FIG. 7, the source 38' of electromagnetic radiation is attached to the side of the applicators 24A, 24B, 24C which allows for patterning and heating/exposing to radiation in a single pass.

The source 38, 38' of electromagnetic radiation may emit radiation having wavelengths ranging from about 400 nm to about 4000 nm. As one example, the electromagnetic radiation may range from about 800 nm to about 1400 nm. As another example, the electromagnetic radiation may range from about 400 nm to about 1200 nm. As still another example, the electromagnetic radiation may be blackbody radiation with a maximum intensity at a wavelength of about 1100 nm. The source 38, 38' of electromagnetic radiation may be infrared (IR) or near-infrared light sources, such as IR or near-IR curing lamps, IR or near-IR light emitting diodes (LED), or lasers with the desirable IR or near-IR electromagnetic wavelengths.

The source 38, 38' of electromagnetic radiation may be operatively connected to a lamp/laser driver, an input/output temperature controller, and temperature sensors, which are collectively shown as radiation system components 40. The radiation system components 40 may operate together to control the source 38, 38' of electromagnetic radiation. The temperature recipe (e.g., radiation exposure rate) may be submitted to the input/output temperature controller. During heating, the temperature sensors may sense the temperature of the build material composition 16, and the temperature measurements may be transmitted to the input/output temperature controller. For example, a thermometer associated with the heated area can provide temperature feedback. The input/output temperature controller may adjust the source 38, 38' of electromagnetic radiation power set points based on any difference between the recipe and the real-time measurements. These power set points are sent to the lamp/laser drivers, which transmit appropriate lamp/laser voltages to the source 38, 38' of electromagnetic radiation. This is one example of the radiation system components 40, and it is to be understood that other radiation source control systems may be used. For example, the controller 36 may be configured to control the source 38, 38' of electromagnetic radiation.

To further illustrate the present disclosure, an example is given herein. It is to be understood this example is provided for illustrative purposes and is not to be construed as limiting the scope of the present disclosure.

Example

Four examples of the build material composition disclosed herein were prepared. The first example build material (labeled "PA 12" in Tables 1 and 2) included a polyamide 12. The second example build material (labeled "PA 11" in Tables 1 and 2) included a polyamide 11. The third example build material (labeled "PA 12-GB" in Tables 1 and 2) included a polyamide 12-GB in which glass beads were encapsulated by the polyamide 12 and the weight ratio of the glass beads to the polyamide 12 was 40:60. The fourth example build material (labeled "PA 6,13" in Tables 1 and 2) included a polyamide 6,13. Each example build material included less than 5 wt % of additives (i.e., antioxidant(s), whitener(s), antistatic agent(s), and flow aid(s)). It is to be understood that the glass beads included in the third example build material are not part of the less than 5 wt % of additives.

The avalanche angle, the break energy, the avalanche energy, and the dynamic density of each of the example build material compositions (i.e., each of the example polyamides) were measured using a REVOLUTION™ instrument (from Mercury Scientific Inc.). Each of the avalanche angle, the break energy, the avalanche energy, and the dynamic density of each of the example build material compositions (i.e., each of the example polyamides) was measured over a 100 avalanches at room temperature using a 100 cc sample of the example build material composition, a rotation rate of 0.3 RPM, an imaging rate of 10 FPS, a prep time of 60 seconds, and an avalanche threshold of 0.65%. The results of these measurements are shown in Table 1.

TABLE 1

| Example build material composition | Avalanche Angle (degrees) | Break energy (kJ/kg) | Avalanche energy (kJ/kg) | Dynamic density (g/cc) |
| --- | --- | --- | --- | --- |
| PA 12 | 36-40 | 27-37 | 7-17 | 0.34-0.38 |
| PA 11 | 44-52 | 38-57 | 8-22 | 0.44-0.48 |
| PA 12-GB | 40-48 | 32-50 | 7-19 | 0.42-0.49 |
| PA 6, 13 | 38-45 | 28-40 | 8-15 | 0.43-0.48 |

The dynamic density of each of the example build material compositions (i.e., each of the example polyamides) was within 15% of the bulk density of the respective example build material composition (i.e., ±15% of the bulk density of the respective example build material composition).

Several 3D objects were printed with each of the example build material compositions using examples of the 3D printing methods disclosed herein. Each 3D object was printed on a large format 3D printer with an example fusing agent that included carbon black as the energy absorber. The fusing agent was not modified for the various build materials.

Each of the example build material compositions was able to be spread into substantially uniform build material layers. Each of the 3D objects was sufficiently fused/coalesced. Further, the non-patterned build material adjacent to each of the 3D objects was able to be removed and separated from the completed 3D object. Thus, each of the example build material compositions was shown to be a suitable build material composition for the 3D printing methods disclosed herein.

Additionally, the elongation at break, ultimate tensile strength, and Young's Modulus of the 3D objects formed from each of the example build material compositions were measured using Instron testing equipment. The impact strength of the 3D objects formed from the first, second, and third example build material compositions was also measured using Instron testing equipment. The impact strength of the 3D objects formed from the fourth example build material composition was not measured. The values for each of these measurements are shown in Table 2. In Table 2, each 3D object is identified by build material composition used to form the 3D object.

TABLE 2

| Build material composition used to form the 3D object | Elongation at Break (%) | Ultimate Tensile Strength (MPa) | Young's Modulus (MPa) | Impact Strength (kJ/m$^2$) |
| --- | --- | --- | --- | --- |
| PA 12 | 20 | 48 | 1800 | 3.5 |
| PA 12-GB | 6.5 | 30 | 2800 | 2.7 |
| PA 11 | 50 | 50 | 1800 | 6 |
| PA 6, 13 | 18 | 54 | 2400 | — |

As shown in Table 2, the mechanical properties (i.e., elongation at break, ultimate tensile strength, Young's Modulus, and impact strength) of the 3D objects formed from the example build material compositions are acceptable for 3D printed objects. Thus, these results further indicate that each of the example build material compositions is a suitable build material composition for the 3D printing methods disclosed herein without adjusting the fusing agent composition.

It is to be understood that the ranges provided herein include the stated range and any value or sub-range within the stated range, as if such values or sub-ranges were explicitly recited. For example, from about 25 kJ/kg to about 57 kJ/kg should be interpreted to include not only the explicitly recited limits of from about 25 kJ/kg to about 57 kJ/kg, but also to include individual values, such as about 28.5 kJ/kg, about 33.67 kJ/kg, about 40.74 kJ/kg, about 47 kJ/kg, about 53.5 kJ/kg, etc., and sub-ranges, such as from about 35 kJ/kg to about 50 kJ/kg, from about 25.5 kJ/kg to about 42.7 kJ/kg, from about 38.71 kJ/kg to about 55.79 kJ/kg, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing kit, comprising:
   a build material composition including a polyamide having:
      an avalanche angle ranging from about 35 degrees to about 55 degrees;
      a break energy ranging from about 25 kJ/kg to about 57 kJ/kg; and
      an avalanche energy ranging from about 7 kJ/kg to about 22 kJ/kg; and
   a fusing agent to be applied to at least a portion of the build material composition during 3D printing, the fusing agent including an energy absorber to absorb electromagnetic radiation to coalesce the polyamide in the at least the portion.

2. The 3D printing kit as defined in claim 1 wherein the polyamide has a dynamic density within about 15% of a bulk density of the polyamide.

3. The 3D printing kit as defined in claim 1 wherein one of:
   (i) the polyamide is a polyamide 12, the avalanche angle ranges from about 36 degrees to about 40 degrees, the break energy ranges from about 27 kJ/kg to about 37 kJ/kg, and the avalanche energy ranges from about 7 kJ/kg to about 17 kJ/kg; or
   (ii) the polyamide is a polyamide 11, the avalanche angle ranges from about 44 degrees to about 52 degrees, the break energy ranges from about 38 kJ/kg to about 57 kJ/kg, and the avalanche energy ranges from about 8 kJ/kg to about 22 kJ/kg; or
   (iii) the polyamide is a polyamide 12-GB, the avalanche angle ranges from about 40 degrees to about 48 degrees, the break energy ranges from about 32 kJ/kg to about 50 kJ/kg, and the avalanche energy ranges from about 7 kJ/kg to about 19 kJ/kg; or
   (iv) the polyamide is a polyamide 6,13, the avalanche angle ranges from about 38 degrees to about 45 degrees, the break energy ranges from about 28 kJ/kg to about 40 kJ/kg, and the avalanche energy ranges from about 8 kJ/kg to about 15 kJ/kg.

4. The 3D printing kit as defined in claim 1 wherein one of:
   (i) the polyamide is a polyamide 12 having a dynamic density ranging from about 0.34 g/cc to about 0.38 g/cc; or
   (ii) the polyamide is a polyamide 11 having a dynamic density ranging from about 0.44 g/cc to about 0.48 g/cc; or
   (iii) the polyamide is a polyamide 12-GB having a dynamic density ranging from about 0.42 g/cc to about 0.49 g/cc; or
   (iv) the polyamide is a polyamide 6,13 having a dynamic density ranging from about 0.43 g/cc to about 0.48 g/cc.

5. The 3D printing kit as defined in claim 1, further comprising a coloring agent selected from the group consisting of a black agent, a cyan agent, a magenta agent, and a yellow agent.

6. The 3D printing kit as defined in claim 1, further comprising a detailing agent including a surfactant, a co-solvent, and water.

7. The 3D printing kit as defined in claim 1 wherein the fusing agent is a core fusing agent and the energy absorber has absorption at least at wavelengths ranging from 400 nm to 780 nm.

8. The 3D printing kit as defined in claim 7, further comprising a primer fusing agent including a plasmonic resonance absorber having absorption at wavelengths ranging from 800 nm to 4000 nm and having transparency at wavelengths ranging from 400 nm to 780 nm.

9. The 3D printing kit as defined in claim 1 wherein the fusing agent is a primer fusing agent and the energy absorber is a plasmonic resonance absorber having absorption at wavelengths ranging from 800 nm to 4000 nm and having transparency at wavelengths ranging from 400 nm to 780 nm.

10. A method for three-dimensional (3D) printing, comprising:
    applying a build material composition to form a build material layer, the build material composition including a polyamide having:
       an avalanche angle ranging from about 35 degrees to about 55 degrees;
       a break energy ranging from about 25 kJ/kg to about 57 kJ/kg; and
       an avalanche energy ranging from about 7 kJ/kg to about 22 kJ/kg;
    based on a 3D object model, selectively applying a fusing agent on at least a portion of the build material layer; and
    exposing the build material layer to electromagnetic radiation to coalesce the build material composition in the at least the portion to form a layer of a 3D object.

11. The method as defined in claim 10, further comprising:
    iteratively applying individual build material layers of the build material composition;
    based on the 3D object model, selectively applying the fusing agent to at least some of the individual build material layers to define individually patterned layers, wherein the fusing agent is selected from the group consisting of a core fusing agent, a primer fusing agent, or both the core fusing agent and the primer fusing agent; and iteratively exposing the individually patterned layers to the electromagnetic radiation to form individual object layers, wherein each of the individual object layers is selected from the group consisting of a core layer, a primer layer, or a layer including a core portion and a primer portion.

12. A method for three-dimensional (3D) printing, comprising:

based on a 3D object model, selectively applying a core fusing agent on at least a portion of a first layer of a build material composition, the build material composition including a polyamide having:

an avalanche angle ranging from about 35 degrees to about 55 degrees;

a break energy ranging from about 25 kJ/kg to about 57 kJ/kg; and an avalanche energy ranging from about 7 kJ/kg to about 22 kJ/kg;

exposing the first layer to electromagnetic radiation to fuse the build material composition in the at least the portion of the first layer to form a core layer;

applying a second layer of the build material composition on the core layer;

based on the 3D object model, selectively applying a primer fusing agent on at least a portion of the second layer, the primer fusing agent including a plasmonic resonance absorber having absorption at wavelengths ranging from 800 nm to 4000 nm and having transparency at wavelengths ranging from 400 nm to 780 nm; and exposing the second layer to electromagnetic radiation to fuse the build material composition in the at least the portion of the second layer to form a primer layer.

13. The method as defined in claim 12, further comprising:

applying a third layer of the build material composition on the primer layer;

based on the 3D object model, selectively applying a coloring agent and (i) the core fusing agent or (ii) the primer fusing agent on at least a portion of the third layer; and exposing the third layer to electromagnetic radiation to fuse the build material composition in the at least the portion of the third layer to form a colored layer having a colorant of the coloring agent embedded therein.

14. The method as defined in claim 13, further comprising applying the coloring agent on the colored layer.

15. The method as defined in claim 14, further comprising applying a detailing agent with the coloring agent.

* * * * *